US008560729B2

(12) United States Patent
Jabri et al.

(10) Patent No.: US 8,560,729 B2
(45) Date of Patent: Oct. 15, 2013

(54) METHOD AND APPARATUS FOR THE ADAPTATION OF MULTIMEDIA CONTENT IN TELECOMMUNICATIONS NETWORKS

(75) Inventors: Marwan A. Jabri, Tiburon, CA (US); Mohamad Raad, Cringila (AU); David Jack, Fairford (GB); Brody Kenrick, San Francisco, CA (US)

(73) Assignee: OnMobile Global Limited, Bangalore (IN)

( * ) Notice: Subject to any disclaimer, the term of this patent is extended or adjusted under 35 U.S.C. 154(b) by 374 days.

(21) Appl. No.: 12/029,119

(22) Filed: Feb. 11, 2008

(65) Prior Publication Data

US 2008/0195761 A1 Aug. 14, 2008

Related U.S. Application Data

(60) Provisional application No. 60/889,237, filed on Feb. 9, 2007, provisional application No. 60/889,249, filed on Feb. 9, 2007.

(51) Int. Cl.
*G06F 15/16* (2006.01)
*H04L 12/66* (2006.01)

(52) U.S. Cl.
USPC .......................................... 709/246; 370/352

(58) Field of Classification Search
USPC ......... 709/201–203, 217–219, 238–244, 246; 725/62–134
See application file for complete search history.

(56) References Cited

U.S. PATENT DOCUMENTS

| | | | |
|---|---|---|---|
| 5,999,525 A | 12/1999 | Krishnaswamy et al. | |
| 6,829,579 B2 | 12/2004 | Jabri et al. | |
| 7,133,521 B2 | 11/2006 | Jabri et al. | |
| 7,145,898 B1* | 12/2006 | Elliott | 370/352 |
| 7,263,481 B2 | 8/2007 | Jabri et al. | |
| 7,363,218 B2 | 4/2008 | Jabri et al. | |
| 2004/0057521 A1 | 3/2004 | Brown et al. | |
| 2004/0252761 A1 | 12/2004 | Brown et al. | |
| 2005/0049855 A1 | 3/2005 | Chong-White et al. | |
| 2005/0053130 A1 | 3/2005 | Jabri et al. | |
| 2005/0111363 A1* | 5/2005 | Snelgrove et al. | 370/230 |
| 2005/0258983 A1 | 11/2005 | Jabri et al. | |
| 2007/0177606 A1 | 8/2007 | Jabri et al. | |
| 2007/0177616 A1 | 8/2007 | Jabri et al. | |

(Continued)

OTHER PUBLICATIONS

International Search Report and Written Opinion of PCT Application No. PCT/US08/53605, dated May 23, 2008, 9 pages total.

(Continued)

*Primary Examiner* — Afshawn Towfighi
(74) *Attorney, Agent, or Firm* — Hoffmann & Baron, LLP

(57) ABSTRACT

An apparatus for adapting media content in one or more networks includes a controller module, one or more network interface modules, and one or more protocol interface modules coupled to the controller module. The apparatus also includes a script interpretation module coupled to the controller module and one or more media adaptation modules coupled to the controller module. The one or more media adaptation modules may support audio, video, or meta data. The apparatus further includes a management interface module coupled to the controller module. Media may be received at the apparatus as streaming media and be provided from the apparatus as a download or a progressive download. Additionally, media may be received at the apparatus as a download or progressive download and be provided from the apparatus as streaming media.

14 Claims, 13 Drawing Sheets

(56) References Cited

U.S. PATENT DOCUMENTS

2007/0180135 A1    8/2007    Kenrick et al.
2007/0201484 A1    8/2007    Kenrick et al.
2007/0291106 A1    12/2007    Kenrick et al.

OTHER PUBLICATIONS

U.S. Appl. No. 12/029,146, filed Feb. 11, 2008, inventor: Marwan Jabri.
U.S. Appl. No. 12/661,468, filed Mar. 16, 2010, Jabri.
U.S. Appl. No. 12/554,473, filed Sep. 4, 2008, Zhou.

* cited by examiner

METHOD AND APPARATUS FOR THE ADAPTATION OF MULTIMEDIA CONTENT IN TELECOMMUNICATIONS NETWORKS

CROSS-REFERENCES TO RELATED APPLICATIONS

This application claims priority to U.S. Provisional Patent Application No. 60/889,237, filed on Feb. 9, 2007, the disclosure of which is hereby incorporated by reference in its entirety for all purposes. This application also claims priority to U.S. Provisional Patent Application No. 60/889,249, filed on Feb. 9, 2007, the disclosure of which is hereby incorporated by reference in its entirety for all purposes.

The following two regular U.S. patent applications (including this one) are being filed concurrently, and the entire disclosure of the other application is incorporated by reference into this application for all purposes:

Application Ser. No. 12/029,119, filed Feb. 11, 2008, entitled "Method and apparatus for the adaptation of multimedia content in telecommunications networks"; and Application Ser. No. 12/029,146, filed Feb. 11, 2008, entitled "Method and apparatus for a multimedia value added service delivery system".

BACKGROUND OF THE INVENTION

This invention relates generally to the field of telecommunications and more specifically to a method and apparatus for the adaptation of multimedia content in a variety of telecommunications networks. With the prevalence of communications networks and devices, multi-media content may now be desired in numerous formats, when these are pre-encoded this consumes significant amounts of memory for storage, bandwidth for exchange and creates complexity in management.

There are multiple sources for video creation, a constant growth in both device types and capabilities and a massive pool of user generated content with only a small fraction being viewed. The range of networks is constantly expanding (2.5G, EDGE, 3G, LTE, 4G, WiFi and WiMax) and networks and devices have varying requirements for which content should be delivered due to factors such as device screen-size and video and audio compression codecs/formats, protocol support (download, progressive or streamed), feature support (e.g. coding tools or meta data access/display), network bandwidth, transmission power and error rates or available memory or CPU.

The diversity of networks, devices, and protocols has led to a focus on the least common capability of a device or network (with a quality impact to better able devices/situations) or to strong device dependency and the management overhead and constant outdating of device specific content.

In present systems, content is typically pre-transcoded into a variety of formats that can be usable and a content management system finds a profile for a device to present properly formatted content. The variation of characteristics that might need transcoding (in the general sense), such as codec, bitrate, frame size, container type, meta information and media processing lead to an exponential increase in the number of objects that are typically maintained and substantial processing with delays is present until content is available. As only popular items are usually accessed, most converted objects will be wastefully converted and stored.

Thus, there is a need in the art for improved methods and systems for adapting multimedia content in various telecommunications networks.

SUMMARY OF THE INVENTION

Embodiments of the present invention provide methods and systems that provide access to and exchange of content stored in a particular format by devices unable to recognize that format or through networks that do not support that format, rate or transport method or other characteristic. These functions are provided while improving the user interface to the content and the efficiency with which the content is provided. Proper allocation of bandwidth and quality of media, service and experience under given restraints are offered by embodiments of the present invention.

According to an embodiment of the present invention, an apparatus for adapting media content in one or more networks is provided. The apparatus includes a controller module, one or more network interface modules, and one or more protocol interface modules coupled to the controller module. The apparatus also includes a script interpretation module coupled to the controller module, one or more media adaptation modules coupled to the controller module, and a management interface module coupled to the controller module.

According to an embodiment of the present invention, an apparatus for providing multimedia content adaptation from multiple formats and qualities to multiple other formats and qualities over a range of networks and transport protocols is provided. The apparatus allows the adaptation of multimedia content from a variety of formats to a variety of other formats in a resource efficient manner. The apparatus allows multimedia content to be stored in a convenient format and accessed from any presentation device through the adaptation of that content. The apparatus is also scalable with demand.

Many benefits are achieved by way of the present invention over conventional techniques. For example, embodiments of the present invention provide methods and systems that provide multimedia content adaptation from multiple formats and qualities to multiple other formats and qualities over a range of networks, network conditions and transport protocols. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

Figure 1A:
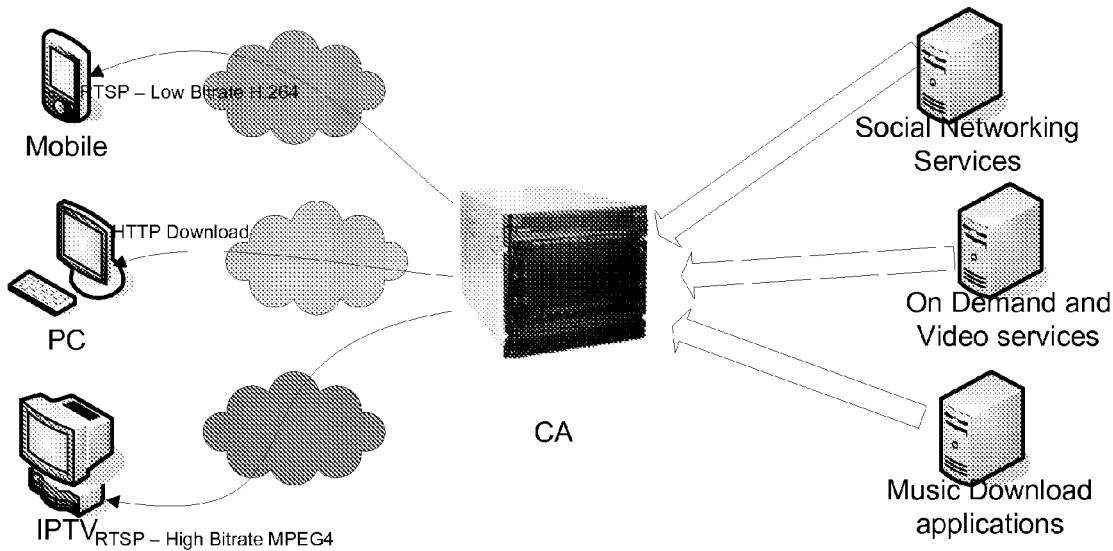
FIG. 1A is a simplified diagram illustrating device and service connectivity provided by an embodiment of the present invention.

Embodiments of the present invention provide many benefits. These benefits are provided by methods and systems that provide multimedia content adaptation from multiple formats and qualities to multiple other formats and qualities over a range of networks and transport protocols. The qualities might include as examples frame sizes, frame rates, protocols, bit-rate encoding profiles (e.g. constant bit-rate, variable bit-rate) coding tools, bitrates, special encoding, such as error correction coding (FEC), and the like. Another benefit is to provide a power and memory efficient content adaptation method. Another benefit is to provide a scalable system that can handle added loads efficiently and be easily expanded to provide additional capacity. A further benefit is to provide an adaptive content adaptation method allowing for caching of content in multiple formats and reducing the load on the content servers. Yet another benefit is to provide an efficient method of user interface adaptation. Still yet another benefit is to provide an apparatus that allows multiple human-machine interfaces to intercommunicate. Another benefit is to provide a system that allows real time as well as non-real time content adaptation. Another benefit is to provide a system that allows fast, accurate user generated content upload to a content database. A further benefit is to provide a system that expands a content database by allowing it to store content generated in multiple formats. Yet another benefit is to provide a system that allows the extraction of different quality content, as measured by codec, size, rate, and the like, from common source content. Still yet another benefit is to provide a method to efficiently create multiple versions of the same content for varying networks, or network conditions. Another benefit is to provide a method of automatically determining an optimal version of the content that should be provided. Another benefit is to provide a method of caching content in multiple formats efficiently thereby reducing the adaptation requirements. A further benefit is to provide a method of short and long term caching of content. Yet another benefit is to provide an apparatus that allows multiple connections using different connection protocols to exist at any one time. Still yet another benefit is to provide a method of adaptively creating and modifying a content adaptation engine. Another benefit is to provide a system that uses both hardware and software units to perform the content adaptation efficiently. Another benefit is to provide a method of controlling both hardware and software modules to create an optimal content adapter at any given time, as required. A further benefit is to provide a system that interfaces with existing and future networks using common interface modules. A further benefit is to provide a system that performs any necessary transcoding either on ingest, or on retrieval, or a mixture of ingest and/or retrieval depending on the features of the service on offer and the services load implications. Yet, another benefit is the adaptation of the media to use a scalable video codec where various level of spatial or frequency information are delivered along one or more transport channel. In this case the receiving device may elect to receive and display the various levels of details if they are received in a timely fashion, integral or error recoverable fashion, and/or based on the device resources. Yet another benefit is to provide a system that allows hardware and software maintenance to be performed in a modular fashion, allowing the system to remain operational during maintenance. Yet another benefit is to provide a system that can act as a redundant back-up for another, similar, system taking on the complete or partial load of the first system as appropriate to the particular application. Another benefit is to provide a system, with some or all previously listed characteristics, that can be managed remotely. Another benefit is to provide a system that provides content access and historical usage data and suggestions on how to better optimize other network components to provide faster content access. Another benefit is to provide a system that provides an ability to maintain and retain information and statistics on usage behavior, the information being useful in data mining and user tracking for either the optimization of a service or for costing of a service or to allow customized content or behavior based on previous behaviors. Another benefit avoids the wastage of processing, storage, management and personnel resources by only transcoding media that customers have requested to see in the particular format that was requested. Another benefit is an adaptive load sharing method when the system is deployed across multiple discrete subsystems.

TABLE 1

Benefits to a Content Portal when using an embodiment Content Adaptor (CA)

| Devices | Content Adaptor | Content Portal/Provider |
|---|---|---|
| 3G Handset<br>Limited H.263,<br>MPEG-4, H.264<br>No facility for update<br>Limited format<br>support<br>Small Screen Size<br>PC<br>Wide range of codecs<br>Very many content<br>sources (too many<br>options)<br>Data rates vary by<br>several orders of<br>magnitude<br>Pay for required<br>quality<br>IPTV<br>Limited codecs<br>(MPEG-2, H.264)<br>Fixed frame size (SD<br>or HD) | Codec Transcoding<br>Frame size conversion<br>Bit-rate adaptation<br>Ad-insertion and Ad-<br>overlay<br>Content Watermarking<br>Stream conversion<br>(e.g. from downloaded<br>objects))<br>Conversions based on<br>rules/triggers, access<br>(browser/player) type,<br>source address etc. | Any content to any<br>device<br>Expand coverage to<br>100% of 3G and non-3G<br>devices<br>Reduces the need for<br>device intelligent<br>applications<br>Expand coverage of<br>content search to any<br>format<br>User tracking via Device<br>tags generated in Content<br>Adaptor |

Other objects and advantages of the present invention will become apparent from the following description, taken in connection with the accompanying drawings, wherein, by way of illustration and example, embodiments of the present invention are disclosed.

According to an embodiment, an apparatus for the adaptation of multimedia content in and between a variety of networks is provided. An apparatus according to an embodiment includes one or more of the following a network interface module that allows the apparatus to operate as part of a network, a communications session management module that establishes connections to other network elements, a user interface translation module that allows user interfaces to be modified to suit other network elements, a human-machine interface translation module, a machine-machine interface translation module, a content adapter creation and control module, a resources control module, a maintenance interface module, one or more memory modules, one or more processing units, a bus controller module and bus, a caching module, and a redundancy facility module.

According to an embodiment, a method of adapting multimedia content from a first telecommunication network to a second telecommunication network is provided comprising one or more of the following establishing a communications session, managing the established communications session, translating interaction data at a user interface, translating human-machine interaction data at a human-machine interface, translating machine-machine interaction data at a machine-machine interface, adapting a first multimedia content from a first protocol to a second multimedia content in a second protocol, controlling access and delivery of the second multimedia content, controlling one or more resources, maintaining the one or more resources using a maintenance interface, determining if a redundancy process is utilized and determining if a expansion process is utilized.

Figure 1B:
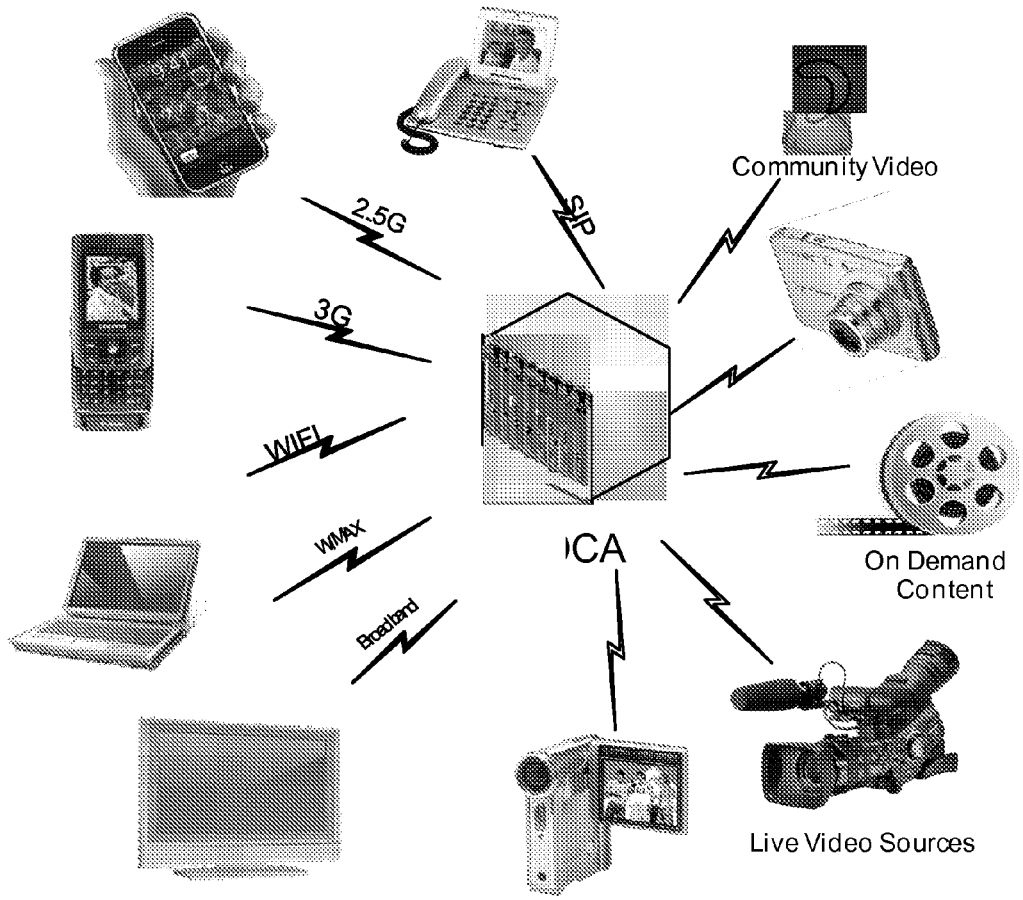
FIG. 1B is a simplified diagram illustrating device and service connectivity provided by an embodiment of the present invention.

An embodiment of the present invention is a network element that may exist in or between a number of different networks or in a number of different places in a single network. FIG. 1A and FIG. 1B show examples of devices and services that may be connected or served by embodiments of the invention. Networks upon which devices operate may be packet switched (PS) networks or circuit switched (CS) networks. Each network employs protocols to initiate communications sessions, provide user interactivity and provide a requested content. The content may be streamed continuously through a streaming protocol such as RTSP (Real Time Streaming Protocol) or downloaded or progressively downloaded through a data exchange protocol such as HTTP (Hyper Text Transfer Protocol), or through other means. The content may also be delivered live (i.e., not pre-recorded) from a variety of sources such as a streaming feed, for example via RTSP or over a different session protocol such as IETF or 3GPP SIP, ITU-T H.323 or ITU-T H.324 (including 3GPP-324M) or a proprietary protocol, such as Skype Video, with or without a separate interworking function (the additional network support may be supported internally or externally and may take the form of elements further described in U.S. patent application Ser. No. 10/099,901, the disclosure of which is hereby incorporated by reference in its entirety for all purposes). The content may also be extracted from a content database. The content database may be connected to the content adapter through a network with a relevant protocol, as in the content database can be a different network element; it may also be collocated and accessible via direct file accesses.

Figure 2:
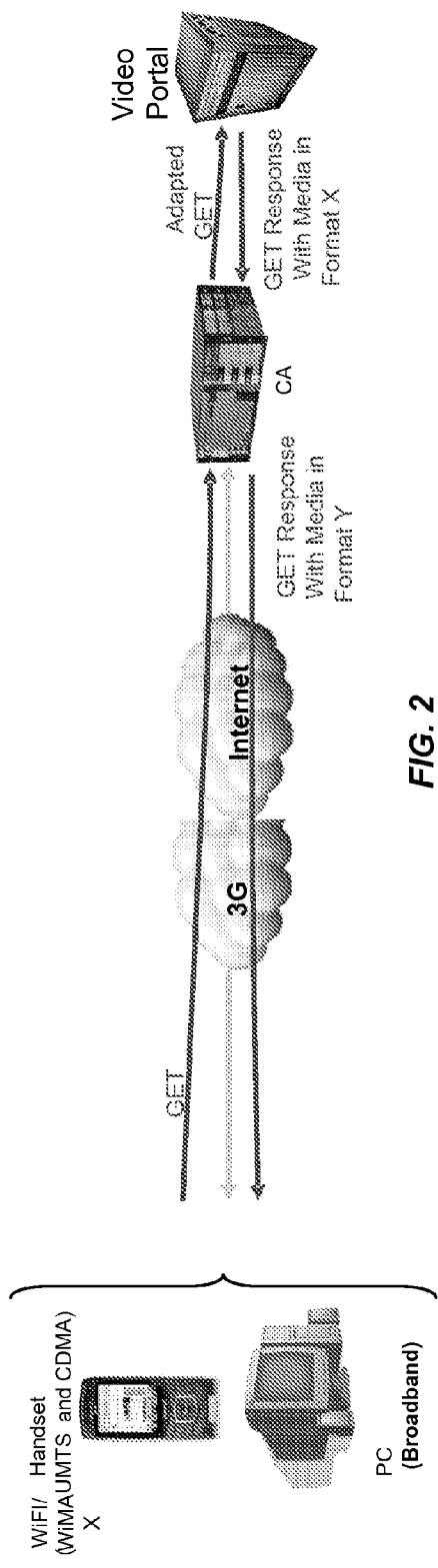
FIG. 2 is a simplified diagram illustrating an example of access to content using HTTP according to an embodiment of the present invention.
Figure 3:
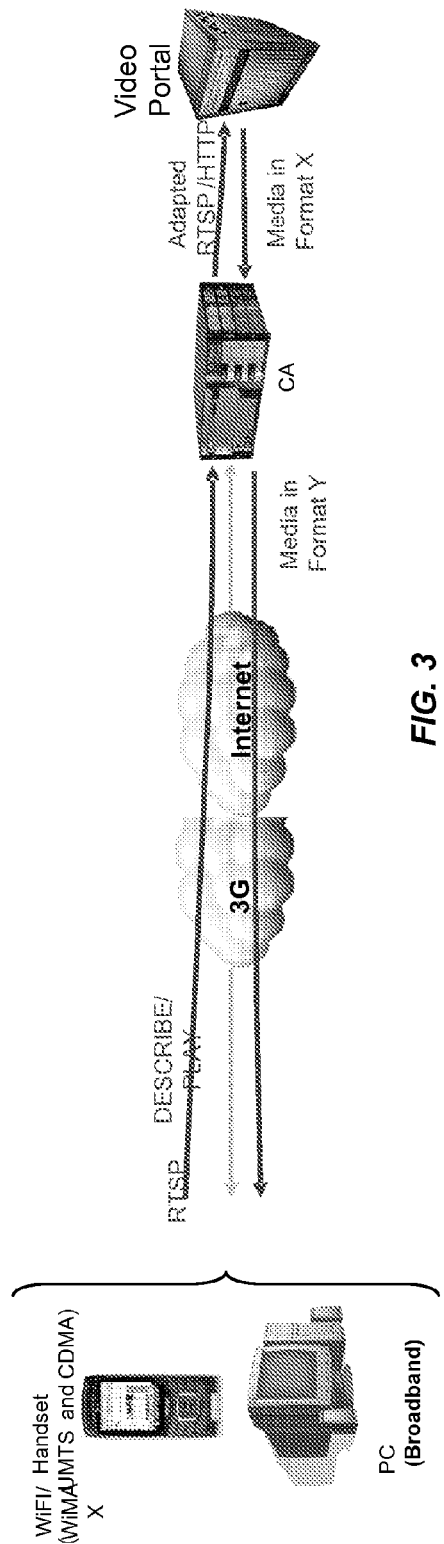
FIG. 3 is a simplified diagram illustrating an example of access to content using RTSP according to an embodiment of the present invention.

One embodiment may establish a connection to a device, or network element, requesting a content object and also to a content database. Examples of this connection are shown in FIG. 2 and FIG. 3. In FIG. 2 the capabilities of the two connected elements are determined. These capabilities may be determined through a capabilities exchange or negotiation, a capability message, or they may be known features of an element, access network or protocol, or associated with the user via a network based, or otherwise located, database (e.g. HSS or HLR). Embodiments determine how the interface of each element could be adapted to suit the other using this capability. In the case of machine-machine interaction, the apparatus can establish the connections through a machine-machine interface translation module.

In the case of human-machine interaction, the apparatus can utilize a machine to human interface translation module. An example of a machine to human interaction is the access of internet web sites through a mobile phone connected to a 3G (third generation) network. As typical mobile phones have a form that is small and lightweight for mobility, viewing many web-sites is impractical. In such a case, the apparatus may establish the connection between the sought web-site and the mobile device through an interface translation module (in this case, machine to human) to allow for more efficient access and a better user experience. The apparatus might also modify the kind of delivery mechanism of the media. In a web to mobile example, the typical HTTP download/progressive retrieval paradigm may be changed to a streaming paradigm. This may be particular useful to compensate for the limited bandwidth and storage space available on many mobile devices. A conversion of download/progressive download to streaming is shown in FIG. 3. Rendering and subsequently streaming media from a server also helps to ensure conformity in experience in those accessing a service over different network types. Embodiments are also adapted for converting a content object for delivery to other devices with lesser or different capabilities, or to comply with a standard mandating a certain capability set, example embodiments are capable of delivering content that would otherwise not be compatible to a DVB or DVB-based device such as a DVB-H receiving device.

Figure 5A:
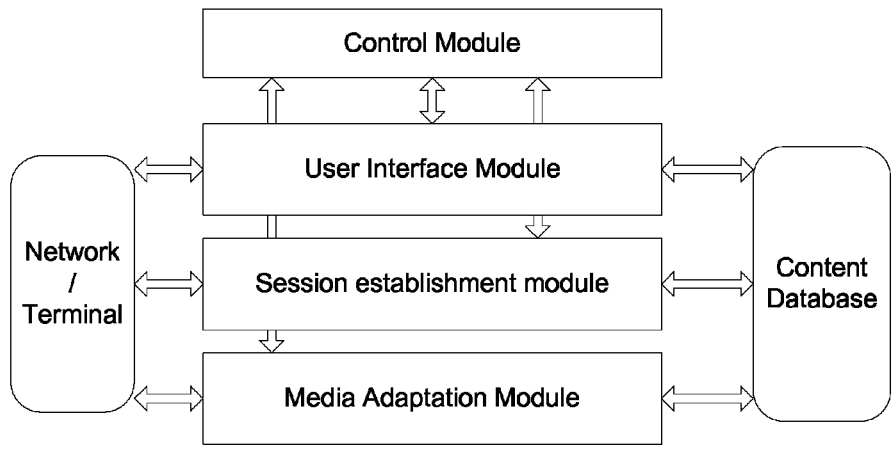
FIG. 5A is a simplified architecture diagram with module interconnection according to an embodiment of the present invention.
Figure 5B:
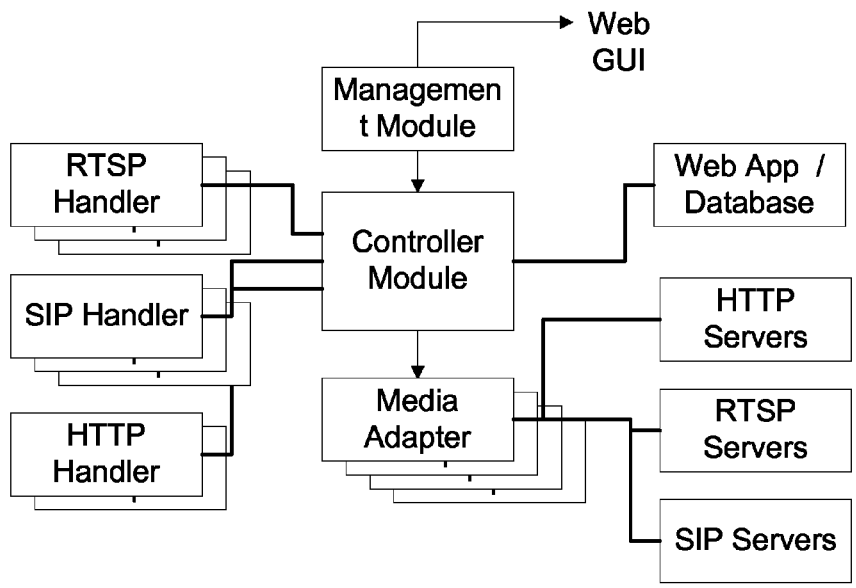
FIG. 5B is a simplified architecture diagram with module interconnection according to an embodiment of the present invention.

An embodiment of the present invention is embodied with a decomposition of modules as shown in FIG. 5A. Network/terminal modules, media adaptation modules, session establishment modules, user interface modules, control module and a content database are connected. An alternative embodiment of the present invention is embodied with a decomposition of modules as shown in FIG. 5B. A network interface, which handles protocols, such as SIP (RFC 3261 and associated RFCs), RTSP (RFC 2326) and HTTP (RFC 2616), a media adapter modules, a management module optionally connected to a web GUI, a control module connected to a content database or web application, and one or more content servers, for example using HTTP, RTSP or SIP are connected.

Figure 4:
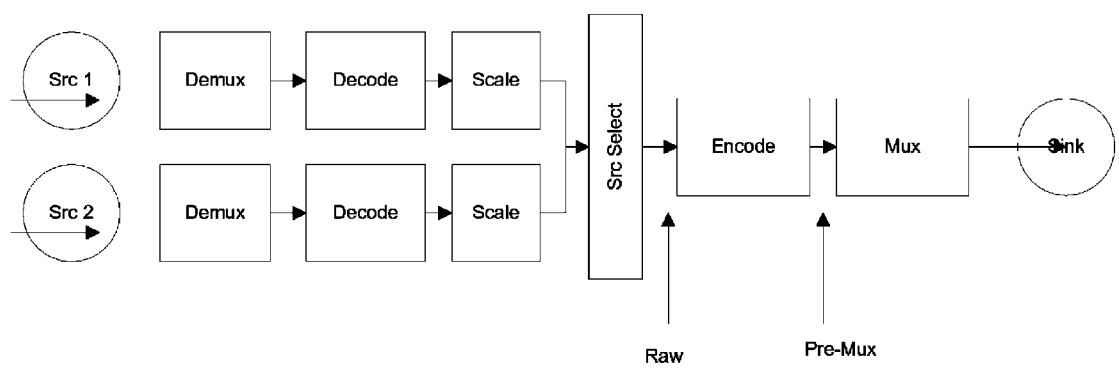
FIG. 4 illustrates a high-level overview of media paths according to an embodiment of the present invention.

Embodiments support advertisement insertion and media splicing. FIG. 4 is a high level overview of the media path in some embodiments, including some key points in the process for those embodiments. The ability to include targeted video advertising into mobile and other services is a key factor in the generation of successful services therefore the ability to 'splice in' ad clips or other media streams is made available in embodiments.

FIG. 4 shows a case where multiple media sources are used for a single client playback session (as might be the case in ad-splicing). The caching has the ability to cache objects such that they can later be spliced together in different ways for playback, but also to provide the maximum efficiency by caching at the output stage (i.e. after encoding). The selection between sources is made at a source select point which may also include media detection facilities to ensure that mid clip switches can happen in a fast but still quality controlled fashion.

Embodiments have the capability to interrupt a stream being played over a single RTSP session and play an alternate clip following a script action/event and once the alternate clip is completed the initial (primary) clip resumes. As the content adaptation is inherent to the embodiment the alternate (inserted) clip need not be in the same format as the primary clip (in terms of codecs, bitrate, framerate, frame size etc).

To support advertising driven services embodiments are able to collect user actions and events, and also provide feedback and notifications in the form of visual messages.

Figure 6:
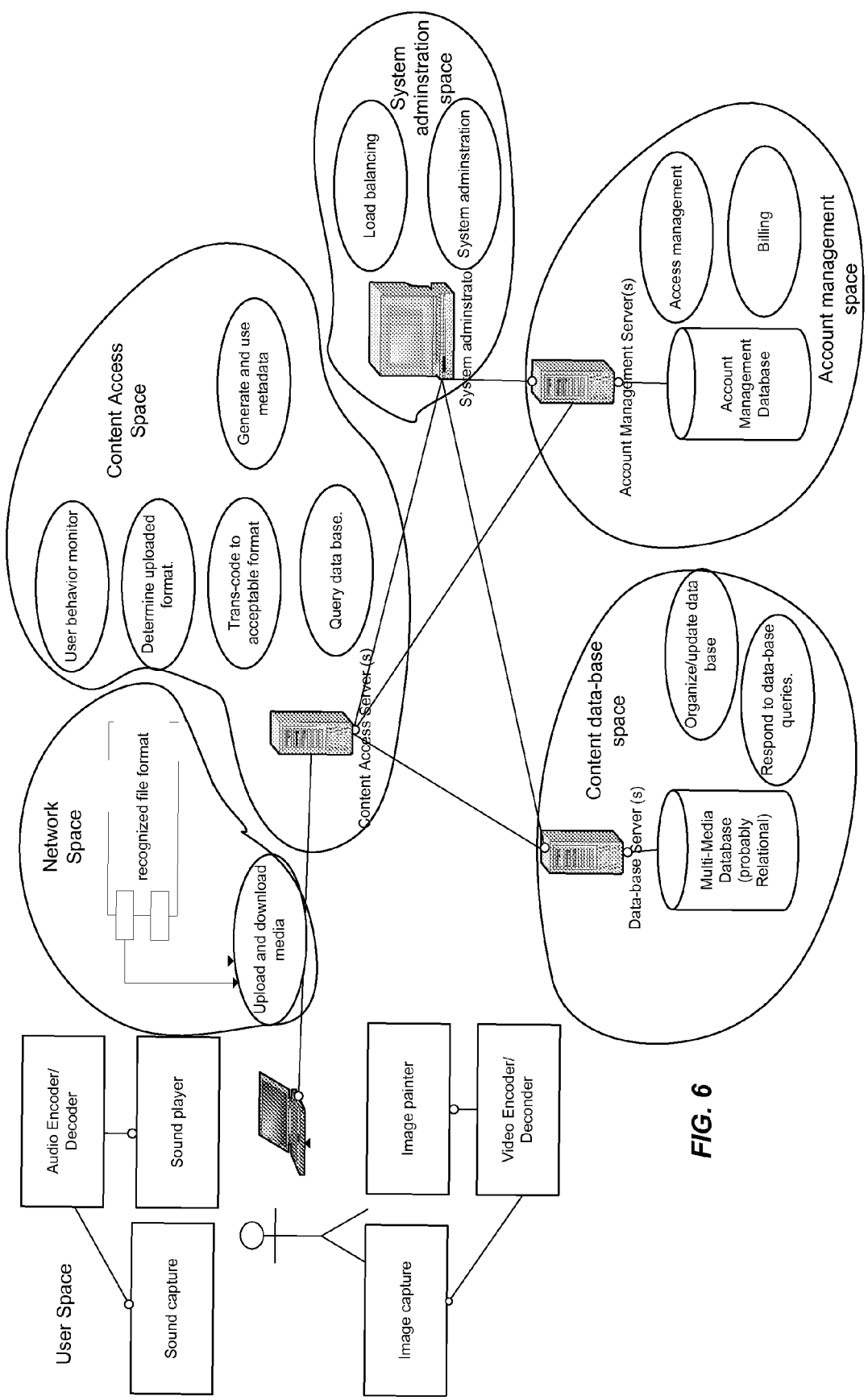
FIG. 6 is a simplified diagram showing a functional decomposition of a system according to an embodiment of the present invention.

An embodiment of the present invention is embodied with a decomposition of modules as shown in FIG. 6. The domain of several functions is limited in this figure for illustrative purposes. In this figure the user space is separated from the service domain aspects in the network space, content access space, system administration space, account management space and content database space.

Once a connection is established between a requester and a content source, some embodiments translate interactivity related information between network elements. As different networks may employ different communications protocols, the interactive information that is passed between end-users and the content servers may need to be translated from one set of messages, signals and data to another set of messages, signals and data. This translation can be performed through an interface translation module. Once a request for content is made to the system, the apparatus determines if the multimedia content needs to be adapted. The decision on whether or not the content requires adaptation is made by a control module, i.e., the session control module, based on the information that was gathered during the capabilities exchange and possibly information determined from the content itself, as well as any pertinent network characteristics. For example, a user may want to upload a 3GP file to a content database which is set-up to accept AVI files. In such a situation, the control module in the apparatus would determine that content adaptation is necessary. Note that in some instances, no content adaptation is required and a pass through of data occurs.

Once the control module determines that adaptation is required, a determination of what type of adaptation to employ then follows. Multimedia data can be divided into a number of different levels associated with its storage. The media itself may be encoded using a variety of techniques, some of which have been standardized such as H.263, H.264, MPEG-1,2,4 (with all the different parts) for video and GSM-AMR, AMR-WB, G.711, G.723.1, G.726, G.729, SMV, EVRC for voice as well as AAC, AAC+, MPEG-1 part 3 (MP3) for audio. Others, such as the Adobe (Macromedia) Flash video encoder, real audio and real media are proprietary.

In the case of a file based media, it is held in what is known as a container, which is a file format (an advantage of using a container is that data can be organized in a more efficient manner and meta-data describing or associated with the contents can be kept in a self-contained manner). It is possible that the same content may be stored in two different containers in a different way or in the same container type with either differing characteristics or differing meta data. An alternative to container storage is the case of live or streamed media (e.g., TV type services), where the coded content may be delivered over a network protocol (e.g. RTP/UDP/IP). This means that content adaptation may need to be performed at some or all of the container level, the media level, or the network transport level. The session control module provided in embodiments of the present invention determines the level of adaptation required.

The present invention in some embodiments also includes an adapter creation and control module. This module collects information about the level of usage of the system resources (e.g., processing, data transfer/bandwidth, memory resources, and the like) which it uses to create the required content adapter efficiently. The required content adapter is determined from the information provided by the session control module. The content adapter includes a container de-multiplexing module, a media trans-coding module, and a container multiplexing module. The container de-multiplexing unit extracts the media data from the container as well as any media meta-data. The media transcoding module uses the media meta-data extracted from the container as well as the media data to produced media data encoded in the required/desired format and meta-data that is related to the data in the new format. The container multiplexing module organizes the transcoded media data and any applicable meta-data in the target container's required format. In some embodiments a multiplexing unit may not be required. For example, some streaming protocols do not require the use of a container to deliver the media data and so no container multiplexing module would be required in this case (although a network transport handler would be required in some cases). Likewise, for the case of receiving streamed content, there may be no need for a de-multiplexing module. The adapter creation and control module determines if any of the mentioned modules are required and, if so, which version should be used as each container type requires a de-multiplexer and multiplexer type. Once the content adapter is no longer required, the system resources are freed by the adapter creation and control module.

To facilitate more efficient and rapid content access, embodiments of the present invention also include a caching module. The caching module can be a time-granular caching (aging) module such that it stores in memory more information for recently accessed content than for older content. As the information present is based on the content and interactive information being exchanged between different network elements, the processing that it performed helps in the generation of scalable information about the content and data being exchanged. For example, content that was accessed most recently would be present in its entirety, content accessed less recently may only have meta-data and some media data stored from it, the least recently accessed content (that is still deemed suitable for caching) has processing meta-data stored, aiding in performing a later adaptation more quickly when and if it needs to be performed again. Examples of processing meta-data might include bit rate information, entropy information or first and second pass encoding information allowing a second processing to occur with less processing and/or better coding efficiency or quality in some instances. The caching module comprises memory and a caching control module.

To allow for system maintenance, embodiments also include a maintenance interface module that is used to directly access and control the various system resources and provide management information in the form of alarms, traps and usage statistics. Finally, the apparatus includes a redundancy facility module that permits it to act as a back-up for another, similar system, or as an expansion system for another, similar system.

The function of content adaptation is not well implemented in present gateways and transcoding engines focus on the use of tandem transcoding. These gateways lack the flexibility required to provide efficient multimedia adaptation for multiple standardized and non-standardized multimedia storage techniques and client, device or network variations on a per session basis. These network elements are also generally built to be passive in that no active role is played in improving the efficiency in which content is exchanged as a whole or the end-user experience in interacting with the network elements that provide the sought after content. To address these and other issues, the embodiments described herein provide a solution that allows efficient and flexible content adaptation that improves the efficiency (for speed, power, quality, memory consumed, and the like) of content delivery as well as end-user experience with the network elements providing the content.

In order to achieve these and other benefits, embodiments of the present invention combine a number of modules. For example, a network interface module, a communications session management module, a user interface translation module, a human-machine interface translation module, a machine-machine interface translation module, a content adapter creation and control module, a resources control module, a maintenance interface module, memory modules, processing units, a bus controller module and bus, a caching module, and a redundancy facility module are combined in an embodiment.

The use of interface translation modules is a new and novel introduction to the multimedia transcoding and adaptation space, as is the use of a content adaptation creation and control module, which combines a number of sub-components of different types to build the required content adapter. These sub-components include, but are not limited to, a container de-multiplexing module, a media transcoding module and a container multiplexing module. The inclusion of an intelligent caching module constitutes another novel feature of embodiments of the present invention, where the caching module includes both memory and a cache control module that allows cached data to be continually revised and changed when the need arises, thus providing time scalable caching.

The network interface module allows the establishment of connections between the present invention and any other network elements in various networks. This module is comprised of hardware and software. The hardware component of the module is defined by current standards or popular proprietary units. In one particular embodiment of the invention, the hardware is an Ethernet network card operated with the appropriate driver software. The software component of the network interface module interprets received messages aimed at establishing a communications session with the invented apparatus and other network elements and prepares messages to establish these sessions.

In an exemplary embodiment, the software component includes an HTTP communications module and an RTSP communications module, where the HTTP module is used to communicate with a content database over the internet and the RTSP module is used to establish a streaming session and to stream content to a 3G mobile phone on a packet network. As this component of the invention is modular, it is flexible in being able to establish a communications session with any other networked device when loaded with required software modules and equipped with the correct hardware. Further embodiments support SIP communications modules and modules capable of streamed and progressive downloads as well as tunneled media in another medium. Adobe's (Macromedia's) RTMP is supported by an RTMP communications module.

The communications session module manages the communications session from the point of initiation until termination. Once a session is established with another device, the purpose of the session is determined by this module. Once the purpose is determined, the communications session is associated with the communications session established with another device. In one embodiment, a 3G mobile device is connected to the apparatus through the network interface module and a content database is also connected to the apparatus through the network interface module. The two communications sessions are then associated with one another by the communications session.

When one of the devices terminates the connection, the communications session module informs the other device and closes the terminated session without necessarily closing the other session as that may become, or may already have become, associated with a third session. In an exemplary embodiment, one 3G device user may demand and obtain content from a content database. Both devices have separate sessions that have been associated through the communications session module. The mentioned 3G device may then terminate its session and the content database session may then become associated with a third session from another 3G mobile device.

The present invention in some embodiments also includes an interface translation module. This module may include a user interface translation module, a human-machine interface translation module, a machine-machine interface translation module, or other types of interfaces translation modules. Many interfaces in existing networks, especially the human-machine interface, are designed with particular applications or platforms in mind. Often decisions are made about which platform to target based on the acceptance of that platform in the marketplace (a platform generally refers to a machine with both hardware and software, but a platform may also be a standardized set of capabilities). Current multimedia gateways and adapters focus almost exclusively on the adaptation of the media without adapting the interfaces that exist as a front-end to that content.

The interface translation module can use the information provided by the communications session module and the network interface module to determine the problems that could occur in interacting with a given interface from a connected device. In one embodiment of this invention, if a 3G hand-held device is associated with a web content server that has a HTML (Hyper Text Markup Language) interface, then the end user will not be able to navigate the interface well unless modifications are made. In some embodiments, the HTML interface is translated to a XHTML (eXtensible HTML) interface to allow the 3G device user to interact. The translation operates by taking the interface in its entirety and automatically generating an interface for the same functionality in XHTML. The translation module is an intelligent module in that it quantifies the purpose of different components on the interface as a human would. In this way, the translation module is novel.

The content adapter creation and control module included in embodiments of the present invention is responsible for the adaptation of any exchanged multimedia content at required levels. Digital multimedia is typically compressed before storage to enable better usage of memory. The compressed signals may be further organized in predefined containers that provide meta-data about the media, as well as information that may aid in the exchange of these signals. For example, the ISO container format defines how audio, video, and meta-data may be organized in a file and how some of that meta-data may be used by streaming servers to reduce the work required to stream that file (hinting). The content adapter control module obtains data in the form of predefined objects from the communications session module and the interface translation module to determine what, if any, adaptation is required, and based on that determination, determines which types of sub-components should be combined together to perform the required adaptation efficiently. This step involves taking into account the required resources and scheduling the use of the resources efficiently according to the demand on the resources.

In one embodiment, a 3G mobile device is requesting to view content that is stored as a Flash Video file without itself being capable of playing Flash Video (which is a proprietary container which may include standardized compression methods). The content creation and control module determines in this instance from the capabilities exchanges that the 3G device can receive the media as an RTSP stream with the video compressed in the H.263 format and the audio in the GSM-AMR format whereas the content is available in the Flash Video container compressed using the H.263 format for video and the MP3 (MPEG-1, part III) format for audio. In this particular embodiment, the content adapter creation module connects a Flash Video de-multiplexing module to an MP3 to GSM-AMR transcoding module and in turn connects the video from the first module and the audio from the second module to an RTSP/RTP output module. The data and meta-data movements between the modules are managed through connection objects that define how memory and bus resources should be allocated for the movement of this data. The control module in this embodiment ensures that the movement and scheduling of processing is manageable for the available resources and provides up to date information to the system control module to ensure that the system does not become overloaded.

In a further embodiment device characteristic detection is performed in the system (for media formatting, bandwidth etc). In addition to selecting characteristics of format and type, the buffering and playback abilities of a device or an access technology could be determined. After buffer/playback characteristics are known these can feed into content selection in an overall service. For example only short clips may be provided for some devices, if for example they don't support streaming, or are supported with a bit rate that is too low for prolonged streaming. The clips for such limited devices could be a shorter version of highlights allowing additional buffering between the clips or could be provided as separate downloadable highlights strung or presented together rather than a single feed.

The content adapter may also perform cross media type conversion, where media might be converted from one form into another. For example, the content adapter might employ a speech recognizer on voice. The recognized text could be either overlaid on the video or added to meta-data subtitles, the recognized text could also be machine translated and used in multiple languages each of which may be stored in the meta-data. Further cross stream processing might also be performed on the media for other purposes, whereby speaker recognition can be used to tag the speech either for display in subtitles, or for a more complete set of meta data that could later be used in referencing the material. Face recognition could be used in a similar fashion. Another example of cross media processing is the case where a standard HTML based web page (possibly also with plug-ins) is rendered into an RTSP media stream for presentation to a device that does not support full or partial browser capabilities (e.g. a SIP Video-Phone, TV Set-Top Box or other media kiosk).

Additional embodiments use the homogenizing capabilities of the content adaptor and some of its cross media processing capabilities to augment search engine crawling of multimedia content and storing of tagged data for efficient later retrieval for both searching and media display purposes.

Additional embodiments incorporate a scheme for evenly distributing load across different processors or servers. When a request is received by the system, only details of the format into which the target media should be converted are known, the properties of the source media are not known at this stage in most cases (codec types, bitrate, frame-rate etc). The system makes an estimate of the real time processing requirements based on the known parameters relating to the output media format, and an estimate of the processing requirements (cost) of the source media based on previous sessions or other similar sessions. This load is used to select a suitable processor based on the load-balancing algorithm in use (e.g. least loaded) and the session then continues. Once the source media has been accessed the parameters can be known and a revised load estimate generated which is then used to update the system load-balancer (and optionally to be used in later estimations).

The present invention in some embodiments also includes an intelligent caching module that is scalable in time. One purpose served by the intelligent caching module is to provide fast access to data that has been recently accessed, thus improving the overall network and system responsiveness. As the apparatus has access to content in numerous formats, the caching of the content is not a simple matter. In one particular embodiment, content may be accessed in a 3GP container as well as in an AVI container with the media compressed in different formats. It is less efficient to always maintain the same content in a number of different formats in the cache. In one embodiment of the present invention, the meta-data extracted from the content is used to determine if that content is already in the cache. If that content is already in the cache but in a different format, then a determination is made if the cache holds processing meta-data (data that will help in speeding up the processing of the adaptation or more efficiently using the resources), or if the media in the cache is more suitable for adaptation itself than if the desired output format was derived directly from the source again (this may be the case for post processed cached files that contain post processed meta-information such as hinting, or for specific elements of a media object such as the audio track). If the cache does not hold any relevant processing meta-data, then the content adaptation is performed and the processing meta-data is added to the cache and associated with the existing content. By associating processing meta-data with media data and meta-data the system "learns" how to better adapt the content, or takes advantage of previous work effort made on content. This approach to caching media provides multiple advantages to content providers and content users. As the access to a specific content item is reduced, the amount of media data held for that content is reduced and replaced with processing meta-data which is designed to consume less memory.

As the specific content item is accessed even less frequently, the meta-data is reduced further until all data related to that specific content item is removed from the cache. In this way, the cache is scalable in time, which is another novel feature provided by embodiments of the present invention. In this particular embodiment, expiration rules supported by various protocols such as HTTP are observed in order to ensure correct tracking of content usage by the source owner. In some cases, additional meta-data may be provided back to content owners relating to details of the device receiving the content such as its type, network access method, and relating to the format in which content was provided.

In one embodiment involving caching and multiple adapter engines the same cache storage can be shared between the multiple adapter engines. The cache storage may be provided using external disk arrays so storage can be grown per deployment needs. In other embodiments involving caching and scripting the cache admission policy can be customized to deployment needs using scripting.

The management of the cache in an embodiment is driven by an algorithm which takes into account popularity, aging (clips popular last month, may not be as popular now), cost (for transcoding, re-transcoding and storage), a weighting (optionally assigned by business logic), an automated facility for off-line caching, a cache accounting facility and inputs into a cache management interface (for example in a Web API).

In some embodiments the presence of an application programming interface (API) for both internal scripting logic and external control is provided. When a client request is received by the system a PHP script will be selected based on the protocol type (e.g. HTTP or RTSP) and/or on the client URL (it is possible to have a selection of different scripts available based on regular expression matching of the URL).

The internal script can be executed in a similar way to the use of PHP in web servers, where the request header data is presented as a series of global variables. Other variants also exist including but not limited to Python, PERL or Java. The script in one embodiment has two main functions. Firstly it defines the codec and transport options that the media returned to the client should use. Secondly it identifies the location of the different source media objects on different source stores (e.g. HTTP or RTSP servers or local or remote disks, SAN, NFS). The mapping of a request may involve multiple media sources for splicing (for example ad-insertion in a pre- or post roll fashion) or mixing of media (picture in picture, advertising overlay or water marking). This allows for pre-roll and post-roll advertising options in a seamless fashion from multiple sources that need not be encoded and managed for each device separately.

The script facilities in some embodiments support a wide range of standard functions and libraries that allow the script to interact with databases or other web services to create advanced applications. In addition custom CDRs and client navigation models can be supported.

In some embodiments when a request is received by the PHP script, a number of script global variables are available for use, for example within a global array. The variables may be one, more or all of CallID (A value used by the system in logging and reporting, or as a system unique call reference), request-URI (The complete URI issued by the client, including any query string), query-string (query string from the client URI), client-address (IP address of the issuing client, e.g., dot notation string format), user-agent (String sent by some clients indicating its user agent, which may be used for device type detection), server-host (the protocol handler's IP address) and RequestHeaders (For HTTP requests this can be a PHP hash of the HTTP headers in the request).

In some embodiments the PHP script is provided with functions for controlling various aspects of the media transaction. For descriptive purposes these can be broken up into Session Handling Functions, Target Media Definition Functions and Media and Execution Control Functions.

Session Handling Functions may include functions such as RequestAccept [Indicates that an incoming request is to be accepted. Typically after the request has been validated in some way (e.g. checking the client IP address is from a valid range, checking against a pre-paid billing system or confirming that the request is valid in some other way). Typically this message would be sent at the start of a session and the TargetMedia options would have already been defined in the script execution (in some cases these are used to determine media parameters needed at acceptance, such as SDP definition of the session in for example RTSP)], RequestReject (reason_code) [Indicates the session should not be accepted with the reason code as described. If this is called the script should exit immediately afterwards and the client will be disconnected], SetProtocolHeader(parameter, value) [Allows definition of protocol-specific parameters (e.g. Content-Type header for HTTP) in the connection response (i.e. response of HTTP GET or RTSP DESCRIBE)], RequestAbort( )[To abort a client connection (that has previously been accepted using RequestAccept). This can be called at any point in the script, after which the script will exit. A typical cause might be the failure to access a specific item of source content.], and RequestClose(reason code) [To gracefully close a client connection and allow for the collection of session statistics (for logging to CDR) if available and configured to capture].

Target Media Definition Functions may include functions such as SetTarget(parameter, value) [Used to define the media format that the system should output for a specific session. It is normally issued before a session is accepted (using RequestAccept) and can accept two strings as arguments in a key-value pair. Multiple SetTarget commands can be issued for specifying the output media format based on several the parameters. The parameters may be mandatory or optional or only required for some session types. Example parameters are audio-format, audio-maxbitrate, video-format, video-maxbitrate, video-framerate, video-width, video-height, file-format, sdp-profile, sdp-audio-profile, sdp-video-profile, sdp-total-bandwidth, sdp-audio-bandwidth, sdp-video-bandwidth].

Media and Execution Control Functions may include functions such as QueueMedia(URL) [Instructs the system to queue the URL for delivery to the client. If no other items are pending in the media queue then processing will begin immediately. This function does not block or return any error. The URL should be URL encoded (using the PHP htmlspecialchars( ) function or similar) to remove any special characters such as '&'. This call could be followed by a call to EventWait] and EventWait(time) [Blocks script execution when waiting for events such as completion of the processing and delivery of a media clip. The maximum time to block may be specified in milliseconds and if the time is set to 0 it can block forever. This function may on completion return a PHP hash with the fields/keys indicating an event type/category (either "SystemEvent" or "MediaEvent") an 'event' and event specific parameters. Example events might be SystemEvent/terminated/no params or release cause indicating a session termination with or without release cause, MediaEvent/EndOfStream/no params or AdapterPlayInfo detailing stream parameters in a hash].

Other functions maybe included such as LogCdr(cdr) which takes as input the call-detail-record (as an opaque string) and logs it into a per-script CDR file.

Advanced client accessible manipulation of the transcoding parameters is also possible by exposing to the requesting entities parameters that can reach the script, this may be done through a query string or another method. This can allow for aspects of the requests to be determined locally at the client device to protect privacy or because of known characteristics of the connection that are only known or more easily known at the client. This client decision might be pre-coded in a content page decided at a server, or client side or may be decided an on device portal. There are many types of information that would be passable pertaining to the media, its adaptation as well as other information such as location based information. One example might be that the client indicates its location (via longitude and latitude, for example on the query string) and receive geographically contextual advertising.

An example used in some embodiment has the target media options and source URL base 64 encoded into the requested URI received from the client. The URI is an encoded form of a query string with value pairs such as http://contentprovider/source.wmv&vc=h263&vbr=128 etc. The values passed in the query string can then be used to determine behavior in the content adapter.

The transcoded media delivered in this way can be finely tuned to match the parameters requested, rather than the "best but under" case that would only be possible in clip selection for pre-encoded content and is obviously capable of continuously rather than discrete dealing with each parameter, hence maximizing quality under known bounds.

Other parameters supported for pass through parameters include DRM or user or product identification. An RTSP request URI or a modification to a SIP header or URI are also variants supported in embodiments of the present invention.

In some embodiments in order to integrate with content management, and other portal services such as pre- and post-paid billing standard PHP database queries, or calls to web services via SOAP or similar are possible. Forms of integration include the use of a database key in place of a base64 URL encoding to identify a specific asset in a content management system, and use of a device database to determine the target codec parameters in place of the values encoded into the requested URL.

Some embodiments support scripted actions to add or remove graphics/images/video from the screen for watermarks, logo/branding, advertising hints or service messages. The images are allowed in a variety of formats and also have their size and position and type of overlay controlled. Alpha-blending of image information with the underlying video image (for watermarks) and anti-aliasing image information with the underlying video (for menus and hints) are also enabled.

Some embodiments pass user inputs to the script, for example using the 'eventwait' function. Events include RTSP PLAY (used to initiate trick play—fast forward (FF)/rewind (RW) operations); RTSP OPTIONS commands (used in some custom player applications to enable non-standard functions) and SIP INFO/UII events and the like.

In some embodiments the system can be controlled or receive input or directed from an external system. This may be achieved using a remote procedure call (RPC) into an API or a defined protocol that is exposed to those controlling entities. The control may be restricted to authenticated or authorized users or devices. The control may be to change one or several of many possible behaviors, such as configuring, updating content listings, scripts, advertising, allowed users and the like.

Some embodiments cache the transcoded output files for re-use to other clients in subsequent sessions. The caching is performed in a way which retains audio-sync. Some embodiments allow the caching of content before it is re-encoded (Raw) to allow personalized clip-inserts if enabled by the controlling script. Both primary clips and inserted clips can be cached.

Some embodiments support a functionality to access content as it is being transcoded and cached from a previous request. This allows for the sharing of the transcoding effort.

The cached content can be stored with associated meta-data: One set of example meta data that can be stored with the content is the Source URL, frame-size, cache expiry, bit rate and frame rate (bit-rate and frame-rate may not be required when RAW content is cached as this is can be defined by the target encode stage).

In some embodiments meta-data is saved to a database in other cases it may be encoded into the filename of the object saved to disk (to remove the need for a content database). The cache expiry rules for each item of content can be derived from the HTTP cache header field when items are sourced from a web server. It is also possible to override the HTTP caching rules.

Cache logs can be produced showing requests for cached objects (hits and misses), request time, object sizes and transfer times. Further cache statistics showing object age distribution, hit rate, age distribution, top 100 cache hit objects, min/max/mean seek times, min/max/mean transfer rates are also produced in some embodiments.

Figure 5C:
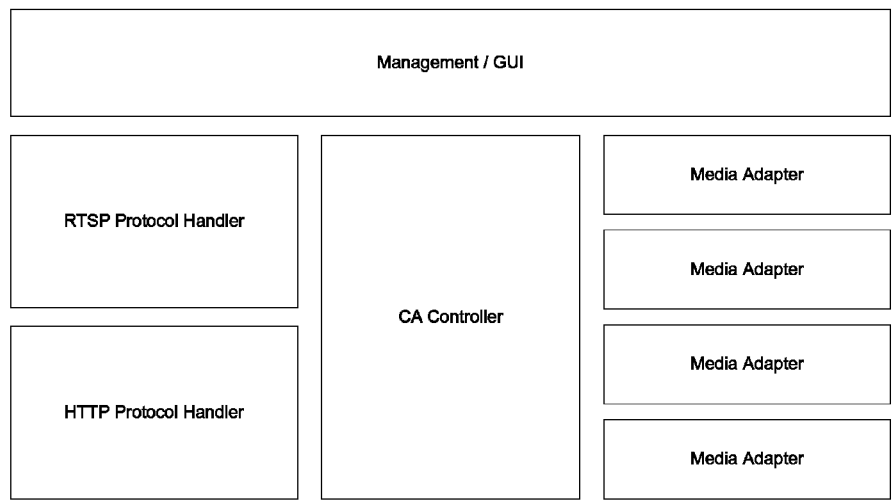
FIG. 5C is a decomposition showing major system elements according to an embodiment of the present invention.

Some embodiments are composed of four major system components as shown in FIG. 5C. These may be hosted on a single server or deployed across multiple servers to provide a scalable solution. FIG. 5C shows this decomposition. The four elements are the management element, the protocol handlers, the system controller and the media adapters.

A Management Element, of which there might only be one across the entire system, is used to gather system statistics and events and can also be used to view and modify the system configuration.

Protocol Handler(s) might be used to serve requests from clients. Multiple protocol handlers may be provisioned in the system, although in most scenarios only one for each protocol to be supported is required.

System Controller might be an element forms the core of the system and is used to execute application scripts for each client request. It also manages load-balancing across the media processing resources (media adapters), and manages system and application specific logs and CDRs.

Media Adapter(s) might be one or more media adapters are required for any system. These provide the low level media transformation and adaptation functions. Load across these elements can be evenly distributed by the system controller.

For small scale services all of the elements can be run on a single server in a 'one box solution'. A single IP address is used for all services (RTSP and HTTP protocol handlers, Web GUI and external content requests). The capacity can be limited to a maximum number of sessions (this may be reduced depending upon the transcoding requirements for the media).

For larger scale services requiring higher capacity than can be afforded in a single server, such as a commercial service, a system can be based on multiple servers. This could be deployed as server blades within a chassis, for example using IBM Blade center hardware.

Some embodiments have a media interface used to carry media data between the Adapter Engine and the Protocol Handler. In some embodiments this interface uses SCTP. SCTP has characteristics for this interface as it is reliable, connection-oriented data delivery with congestion control, message framing (allowing discrete RTP packets to be sent as messages) and multi-streaming (supports multiple message streams multiplexed over a single connection, data loss in one stream will not affect any other streams). In some situations SCTP is preferable over UDP since UDP is unreliable by nature, and since the content sources in many cases are delivered over a reliable connection it is not acceptable that the content adapter should have the potential to corrupt the media data as it is handled internally. In addition UDP offers no mechanism for flow control within itself. SCTP can also support multi-homing (so traffic from multiple IP addresses can be delivered over a common connection).

Some embodiments allow for load balancing and monitoring. In order to manage performance of the system a mechanism can be put in place whereby an Adapter Engine can properly regulate its own load. This may range from simple system to one which is more sophisticated depending on the load regulation needed.

Each Adapter Engine in some embodiments uses at is basic measurement of performance the number of processor cores times megahertz divided by cores available for processing (some embodiments may dedicate a core for another purpose or restrict its usage because of licensing), giving a rough estimate of overall performance (varying chip types may need to be normalized to a selected level, such as Intel 686). Some embodiments are provisioned with a max-load parameter which is intended to maintain the system to not exceed a known level (e.g. 80%) and effectively reduces the total MHz available.

When each request arrives from the controller to add another session to the AE along with confirming capabilities of the AE (that the target media type is valid and supported) it should confirm that resources are available for the system. This should be done first by making a total of all the costs for all ongoing sessions and adding to that using an assumed 'cost' for the new session based on the target media options and a (provisioned) estimate for the decode element of the session.

Once the session is established the cost should be updated based on any new information that becomes available (e.g. source codec type, bitrate, framerate, frame size etc in the cases where video is held in container files and is not readable via SDP).

Figure 7A:
FIG. 7A-7C are simplified connection diagrams for ingest and retrieval from an element through a content adapter according to an embodiment of the present invention.
Figure 7B:
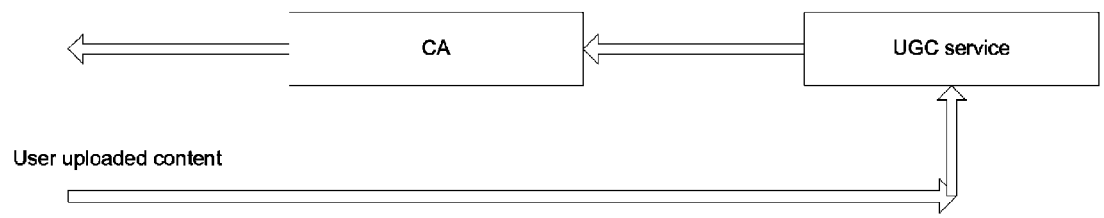
Figure 7C:
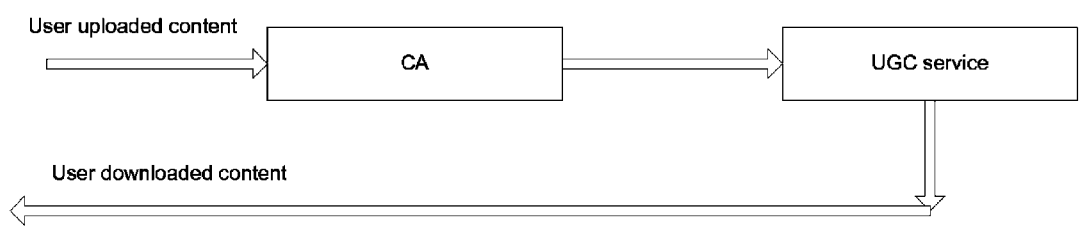

FIG. 7A-7C are simplified connection diagrams for ingest and retrieval from an element through a content adapter according to an embodiment of the present invention. FIG. 7A represents a general case where characteristics of the depositing and retrieving device are different to the user generated content repository (UGC), or unknown, or in a network with different or controlled characteristics (codecs or non-trusted domain). In this case the CA is in the path and capable of adapting/transcoding on ingest as well as supply. FIG. 7B shows a case where only accessing the UGC is interfaced via a CA, an example would be for the case where the content is stored in an incompatible format to a suite of devices and the CA acts as a gateway for those devices. FIG. 7C shows the case where the UGC has transcoding on ingest. An example here might be that devices are incompatible to the UGC storage container format, or media format and are adapted on input so that they are accessible in the desired format from other users. For example uploading a blog clip from a mobile phone via streaming or a video-telephony call to a web based content portal that might use Flash Video for all other accesses.

Network load factors might also determine the use of one or all of the different placements in FIG. 7A-7C. Differing strategies can be employed according to traffic patterns or even based on the expected likelihood of a contents access. For example content that is likely to be accessed, as determined by user id or similar, might be transcoded on ingest and readied for immediate use for a known popular poster, but perhaps no transcoding would occur on other users where the expectation of accessing is not as high. In this way resources can be conserved.

Figure 8A:
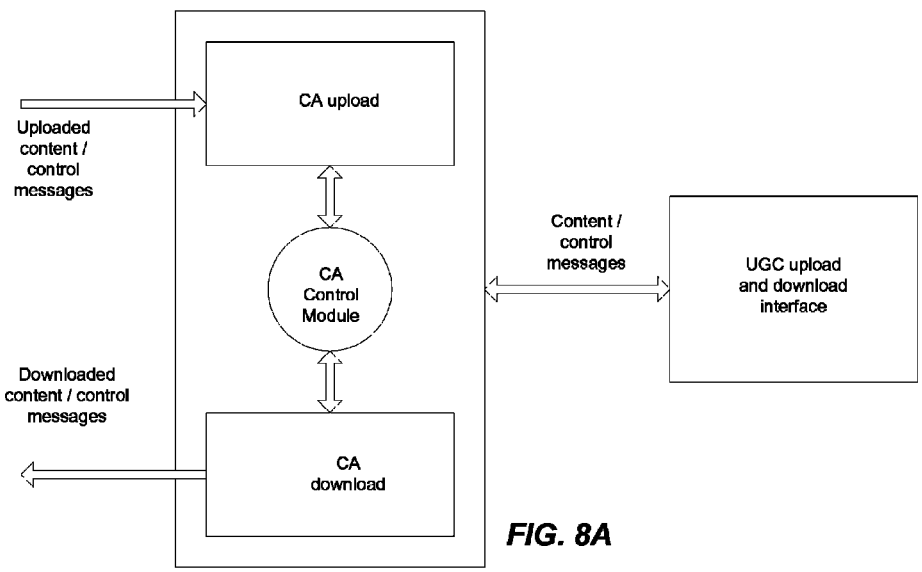
FIGS. 8A-8C are simplified architecture diagrams showing positioning of content adaptation control according to an embodiment of the present invention.
Figure 8B:
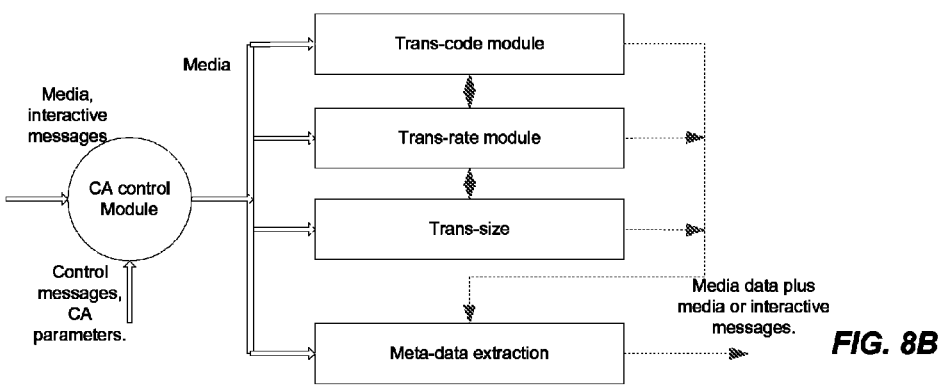
Figure 8C:
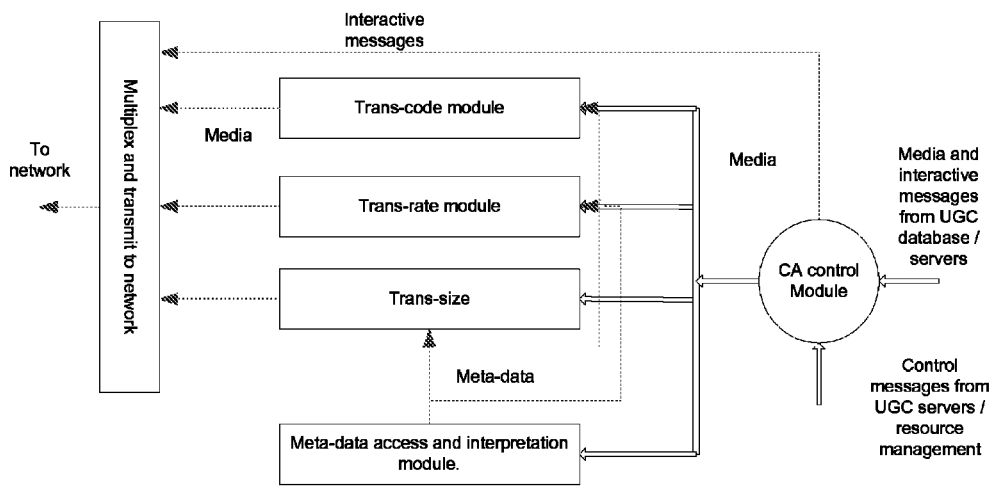

FIGS. 8A-8C are simplified architecture diagrams showing positioning of content adaptation control according to an embodiment of the present invention. FIG. 8A-8C show that in embodiments the control for the adaptation can exist in varying positions inside the systems for differing advantage. FIG. 8A shows a bi-directional control interface that is situated between the client and content. This positioning generally makes sense for cases where the content has both an ingest and a play out interface and it is desired that a client would be able to interface with both. Various specific aspects of the uploading and downloading could be in modules controlled by the control. FIG. 8B shows the control being active on media and messages provided by a client and adaptation of that media through various processing modules. FIG. 8C shows the control being active on media and messages from the content supplier and media adaptation/processing and followed by media, meta data/control message multiplexing before depositing to the network.

Figure 9:
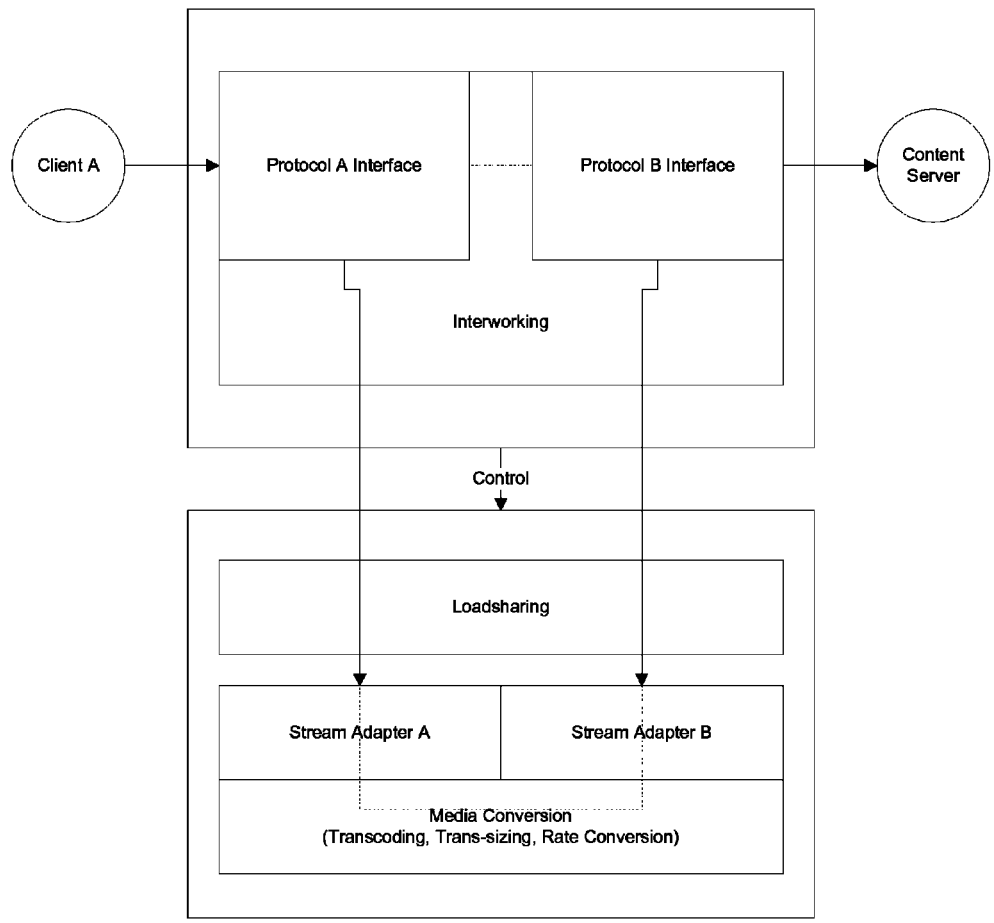
FIG. 9 is a simplified architecture diagram showing a decomposition of a content adapter according to an embodiment of the present invention.

FIG. 9 is a simplified architecture diagram showing a decomposition of a content adapter according to an embodiment of the present invention. It shows a load balancer between the media adaptation and the control. The protocol A and B interfaces may be SIP, RTSP, HTTP or another session based protocol. This element could be provided in a similar way to an MRFC in IMS terms. The lower element may be considered as an MRFP in the same way. The control interface between the components may be MSML/MSMO, or may be a more limited application specific interface.

Figure 10:
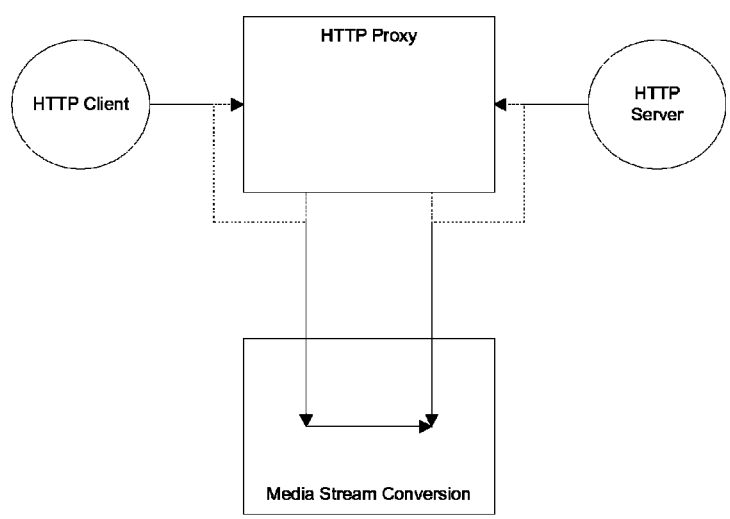
FIG. 10 is a simplified architecture diagram showing a decomposition of a content adapter in an HTTP proxy role according to an embodiment of the present invention.

FIG. 10 is a simplified architecture diagram showing a decomposition of a content adapter in an HTTP proxy role according to an embodiment. In this embodiment the invention is used by web-based media services, where either conversion is required from a wide range of source formats and encoder settings into a common set during upload (HTTP POST) for example a blog or YouTube content upload or conversion is required from a single high quality source format into a wide range of output formats for download (HTTP GET).

Figure 11:
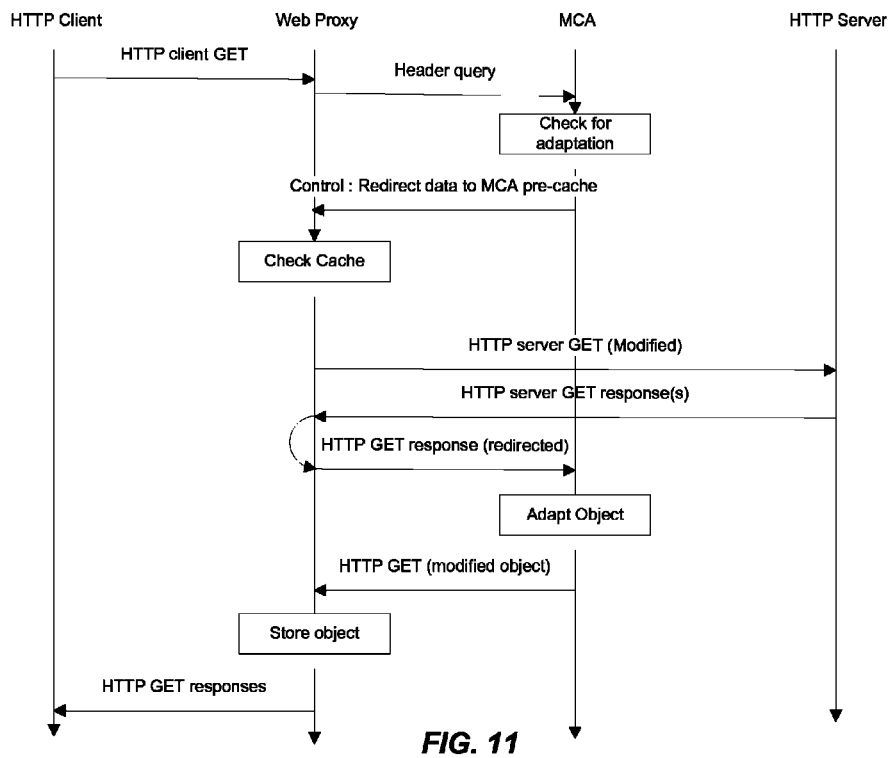
FIG. 11 is a simplified diagram illustrating content adaptation before a caching operation in an HTTP GET method according to an embodiment of the present invention.
Figure 12:
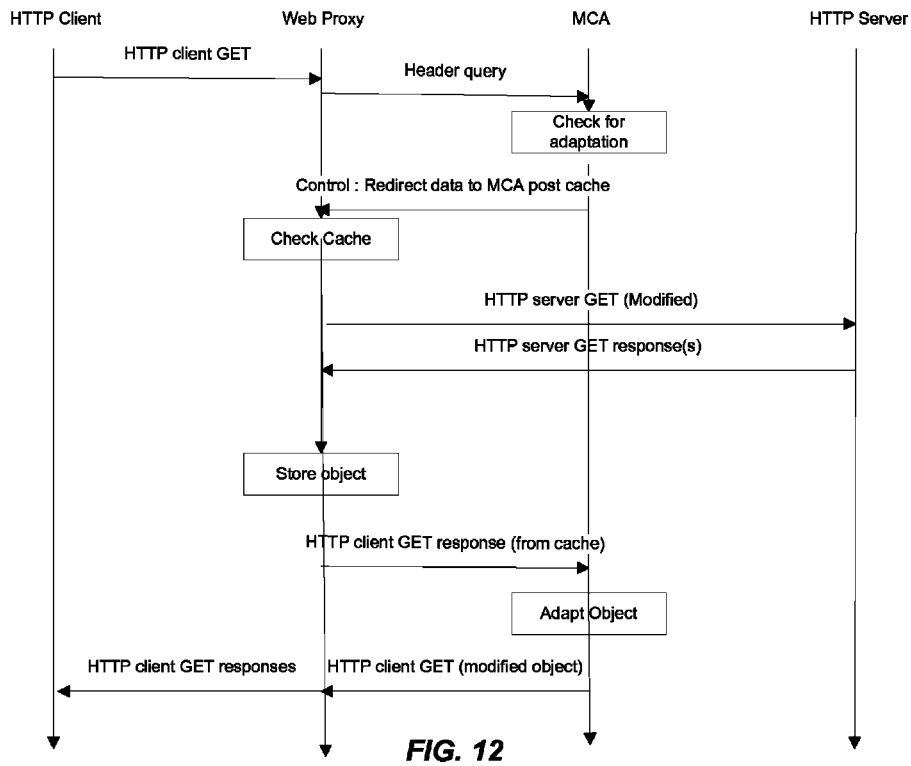
FIG. 12 is a simplified diagram illustrating content adaptation after a caching operation in an HTTP GET method according to an embodiment of the present invention.

FIG. 11 is a simplified diagram illustrating content adaptation before a caching operation in an HTTP GET method according to an embodiment. Media is converted pre-cache. FIG. 12 is a simplified diagram illustrating content adaptation after a caching operation in an HTTP GET method according to an embodiment of the present invention. User makes request for content, the request may include tags in URL to indicate desired target format or the proxy can check to see if data relating to the URL triggers media conversion (requested content extension, domain name, IP address range, browser type etc). The proxy will look in content store for correct media store (incl. URL media tags), and if it is present will transfer it back to client. If a URL trigger or media tags are found then the Media Adaptor should be enabled (data will be redirected from the proxy through the media converter), (e.g. size conversion) then makes a request for material from source (source URL). As data is received it should be passed to media converter before being buffered (e.g. block wise). A single connection could be multiplexed for multiple content requests to maintain good performance. Incoming data to the CA is analyzed and buffered until source media parameters can be decoded or determined (codec, bitrate, frame-size etc). Once transcoding parameters are known media can be processed from the buffer and delivered.

Figure 13:
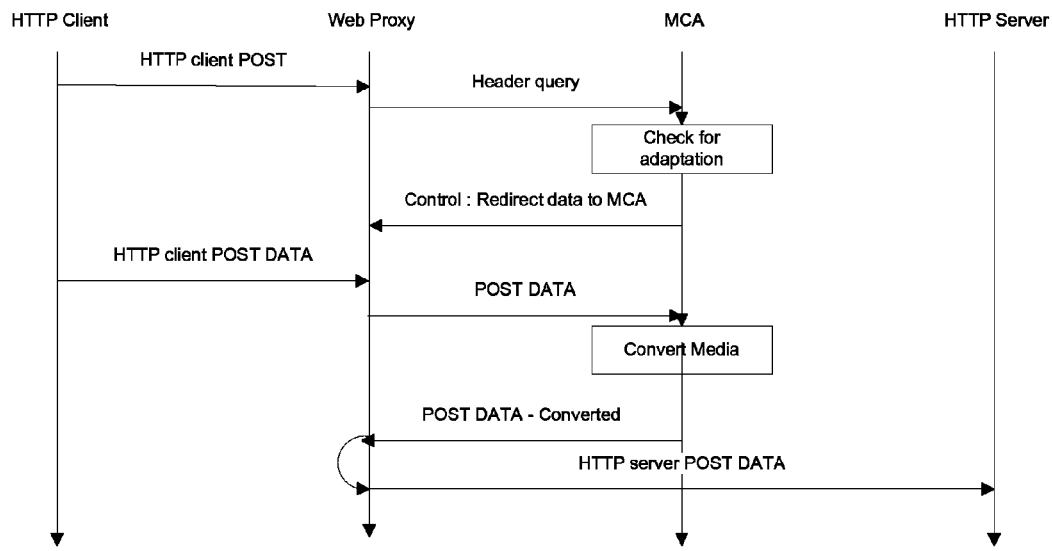
FIG. 13 is a simplified diagram illustrating content adaptation before a caching operation in an HTTP PUT method according to an embodiment of the present invention.
Figure 14:
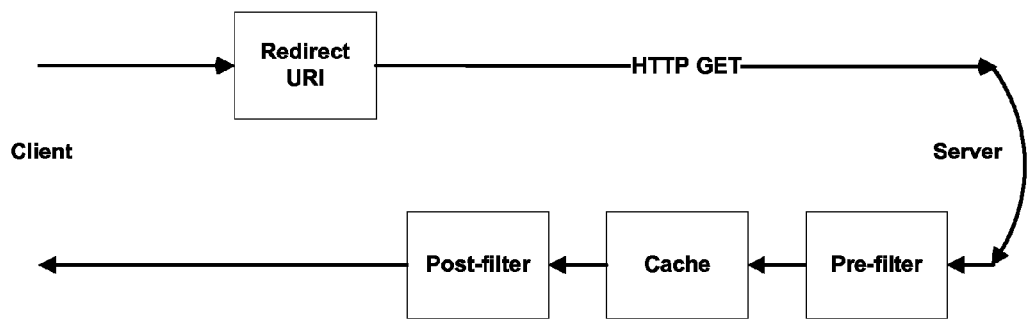
FIG. 14 is a simplified operation involving a URL redirection to a content adapter according to an embodiment of the present invention.

FIG. 13 is a simplified diagram illustrating content adaptation before a caching operation in an HTTP PUT method according to an embodiment of the present invention. HTTP PUT/POST. A user (person or device) makes a POST request to a server which may include tags in URL to indicate desired target format (e.g. MSMO). The proxy will check to see if data is to me adapted is to be mangled based on rules (requested content extension, domain name, IP address range, browser type etc). The media converter is enabled for this stream if media conversion is required and the data from source (HTTP client) and proxy is redirected to the CA. As data is received it can be passed to media converter before being buffered (e.g. block wise). Incoming data is analyzed and buffered by media converter until source details are known (codec, bitrate, frame-size etc) and once transcoding parameters are understood media can be processed from buffer and subsequent blocks. As data is delivered from the media converter it is transcoded and passed to server as normal FIG. 14 is a simplified operation involving a URL redirection to a content adapter according to an embodiment of the present invention. The behavior of the shown filter is that it will always cache the original data (rather than the filtered or transcoded version). Alternatives allow the system to specify whether caching should be made pre- or post-filter (globally or per content type/URL). A standard proxy server normally cannot support multiple objects being cached under the same URL and as such it may be necessary to modify URLs if they are to be stored after transcoding to ensure that multiple copies are retained.

Figure 15:
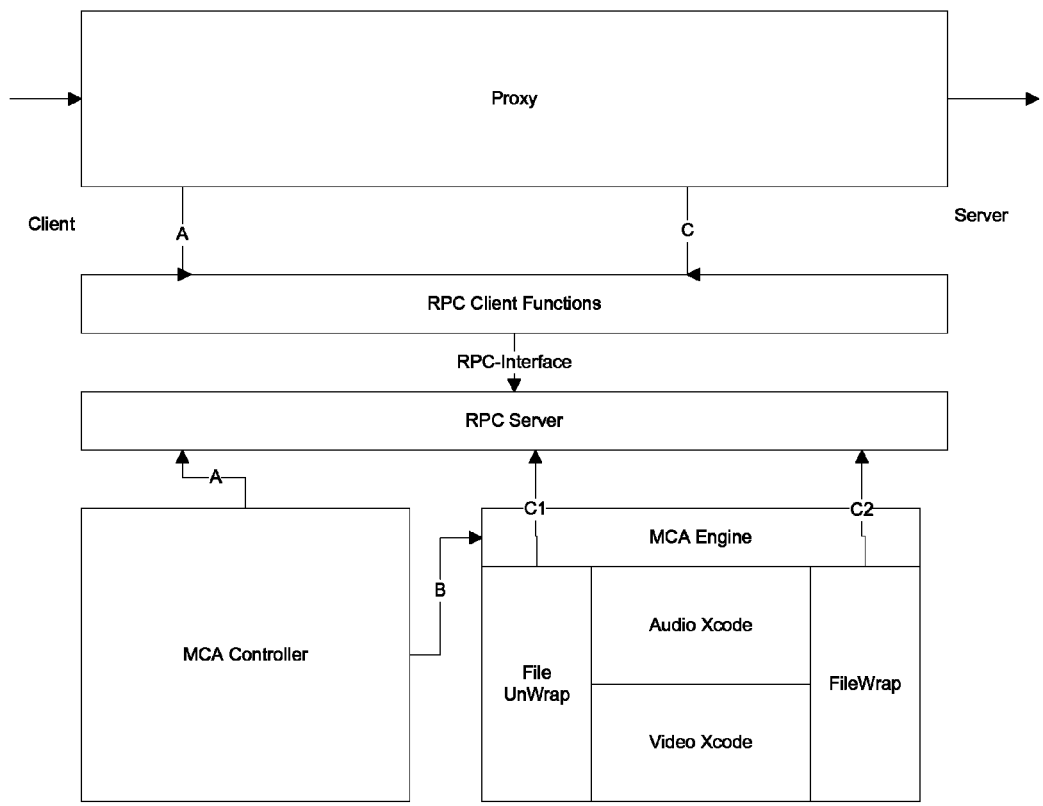
FIG. 15 is a simplified connection architecture for a content adapter offering HTTP content adaptation according to an embodiment of the present invention.

FIG. 15 is a simplified connection architecture for a content adapter offering content adaptation according to an embodiment of the present invention. The proxy may be an HTTP proxy and the remote procedure call (RPC) client functions might be provided by XML-RPC. In this architecture a CA Controller provides system level control for the CA, including provisioning, management and control. It incorporates a URL analyzer and redirector function which is used to control which types of object requests are to be processed by the CA, along with interfaces to the proxy itself to control where it should direct data streams for objects (if they are to be processed). URL trigger rules should be able to be defined in order, and should contain definitions for the target media format to be delivered for URL objects which should be processed. In this architecture a CA Engine is a high level element containing all of the sub-components used in converting a file from one type to another. Contains control interface to/from the CA controller. This component will initially be developed as a separate server based process/application, but may migrate to a DSP based platform in order to deliver the required high densities. A single queue is used for inbound requests and passed to individual transcoding objects—these must be constructed dynamically as the 'shape' of the incoming data is understood. The File Unwrap is used to unwrap files as they are delivered from the content server (via the proxy). It is assumed that in general the specifics of the file type cannot be determined based on the URL, and so this information must be found by reading the file format (codec types, bitrates, frame sizes etc). In some cases determination may be possible, for example in assets retrieved from a known and trusted locations. The File Wrap provides encapsulation for audio and video components as required for target file format. The Audio Xcode provides an Audio media transcoder function and the Video Xcode provides Video media transcoder function. The media transcoding might be provided as a tandem transcoder (back to back decoder and encoder) or as a smart transcoder that may afford better performance on a number of dimensions including media quality and processing cost. These intelligent transcoders are further described in U.S. Pat. Nos. 6,829,579, 7,133, 521, and 7,263,481, and U.S. patent application Ser. Nos. 10/620,329, 10/693,620, 10/642,422, 10/660,468, and 10/843,844, the disclosures of which are hereby incorporated by reference in their entirety for all purposes.

Some embodiments are adaptive on error behavior and support a media processing features pipeline as described in U.S. patent application Ser. No. 10/762,829, the disclosure of which is hereby incorporated by reference in its entirety for all purposes. The ability for video intra coded frames (or similar refresh points), or in other media significant features, either preemptively or based on channel knowledge can substantially increase quality when delivering to an errored channel. Additionally the system can insert additional intra coded frames, or add redundancy in audio frames, or additional material from a scalable video source or add forward error correction (or increased protection with an FEC either via increased redundancy or lengthened time base).

Figure 16:
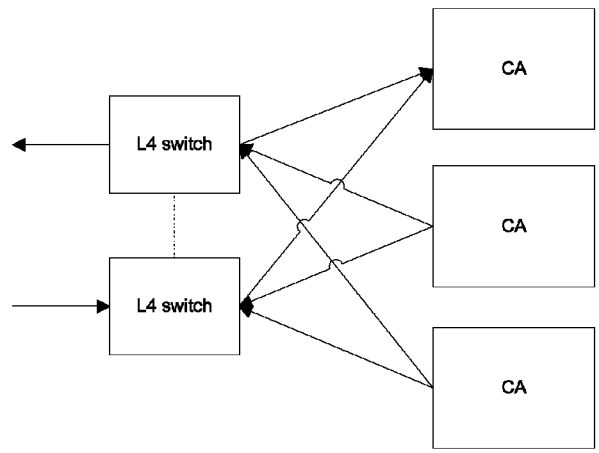
FIG. 16 is a sequence diagram illustrating RTSP client connecting to an HTTP source according to an embodiment of the present invention.

For services requiring high availability multiple separate identical (or similar) systems can be deployed together using standard Layer 4-Layer 7 (L4-L7) load-balancing switches. These may be configured in an active-active or active-standby configuration. The switches may either be external, or may be fitted into the switch slots in a blade center chassis. The use of L4-7 switches can provide system scaling beyond the capacity offered by a single chassis solution. The Layer 4 switches can distribute inbound RTSP or HTTP requests across 2 or more standalone systems. The switches can also monitor the health of the systems by issuing periodic client requests to them; if the correct response is not received the switches will take the relevant systems out of the load-sharing pool. This is illustrated in FIG. 16. Incoming HTTP and RTSP requests are distributed over the available CA systems based on load sharing rules (least-loaded, round robin etc).

Figure 17:
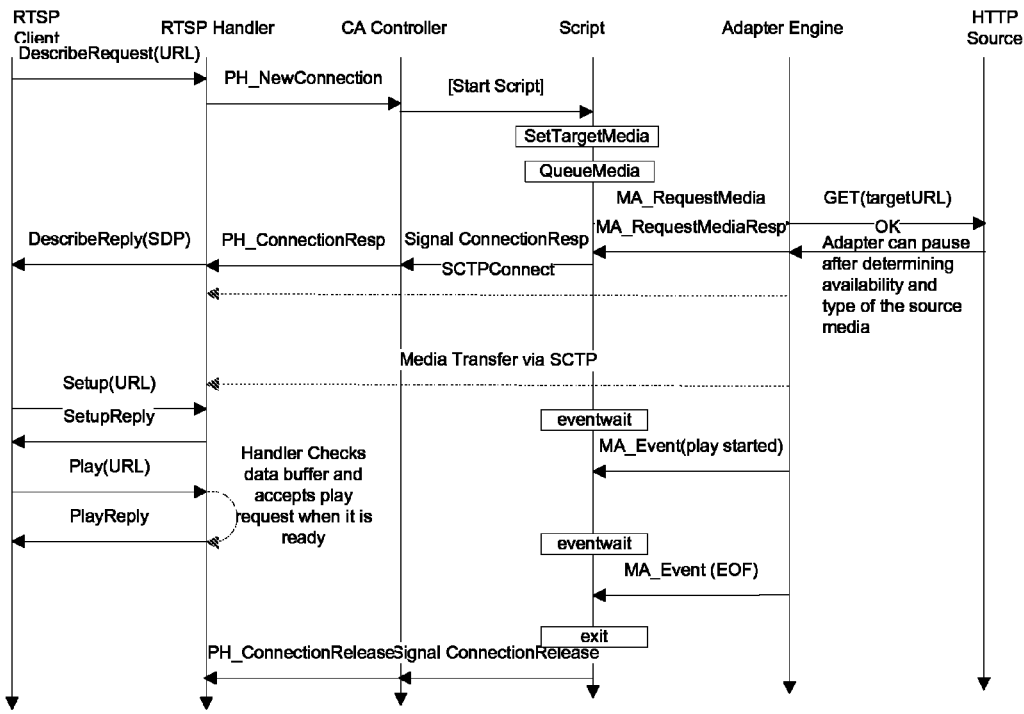
FIG. 17 is a sequence diagram illustrating RTSP client connecting to an HTTP source according to an embodiment of the present invention.
Figure 18:
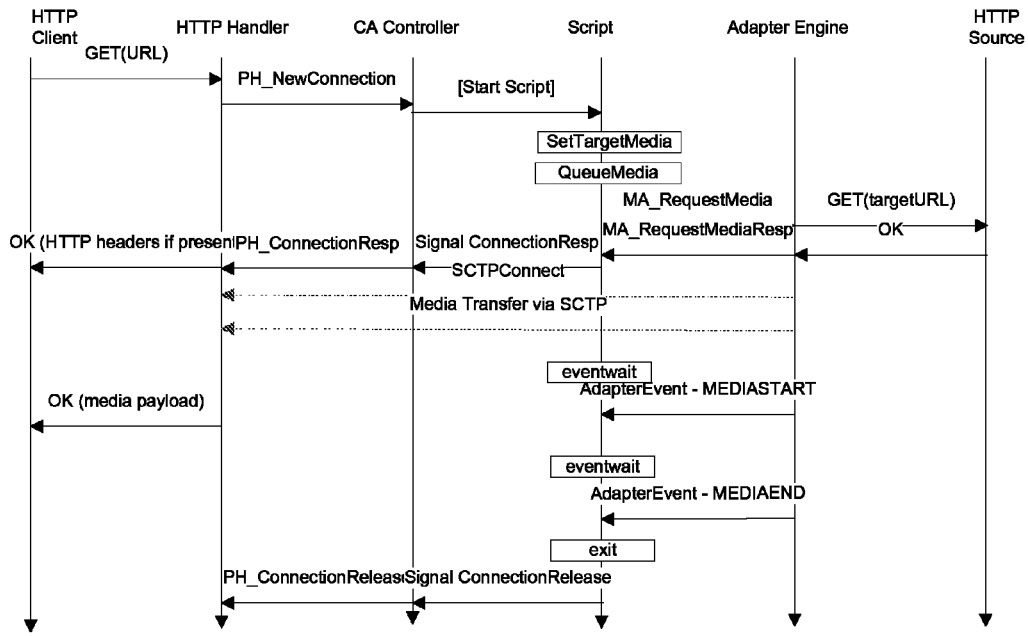
FIG. 18 is a sequence diagram illustrating HTTP client connecting to an HTTP source according to an embodiment of the present invention.

FIGS. 17, 18, 19, and 20 show interactions between the various components of an embodiment for a variety of scenarios. The client, the protocol handler, the controller, the script, the adapter engine and the source are shown. FIG. 17 shows an RTSP client connecting to an HTTP source. FIG. 18 shows an HTTP client connecting to an HTTP source.

Figure 19:
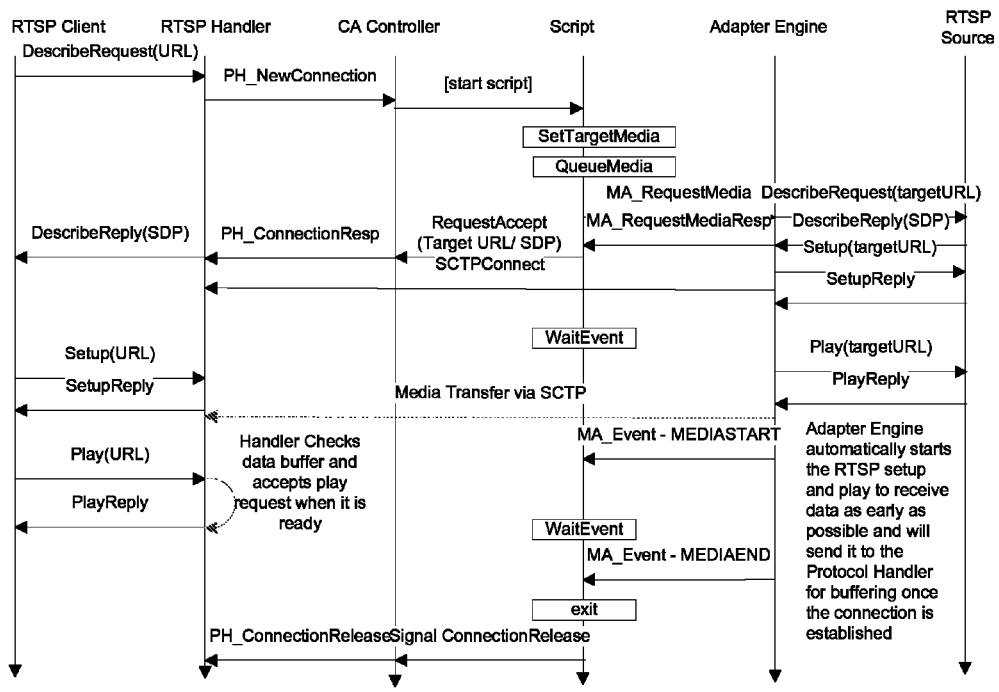
FIG. 19 is a sequence diagram illustrating RTSP client connecting to an RTSP source according to an embodiment of the present invention.

FIG. 19 shows an RTSP client connecting to an RTSP source. In some embodiments the Adapter Engine automatically starts the RTSP SETUP and PLAY to receive data as early as possible and will send it to the Protocol Handler (PH) for buffering. Once the connection is established then RTSP PH buffers the received stream data until a play request is received; it should also wait until it has a sufficient buffer of data to ensure it can playback in real time (taking account of the content length, and the delivery rate of incoming data). In some embodiments the Protocol Handler should keep the SCTP socket open until it is disconnected by the adapter (which will happen at teardown) so that multiple PLAY requests can be scheduled down a common client connection.

Figure 20:
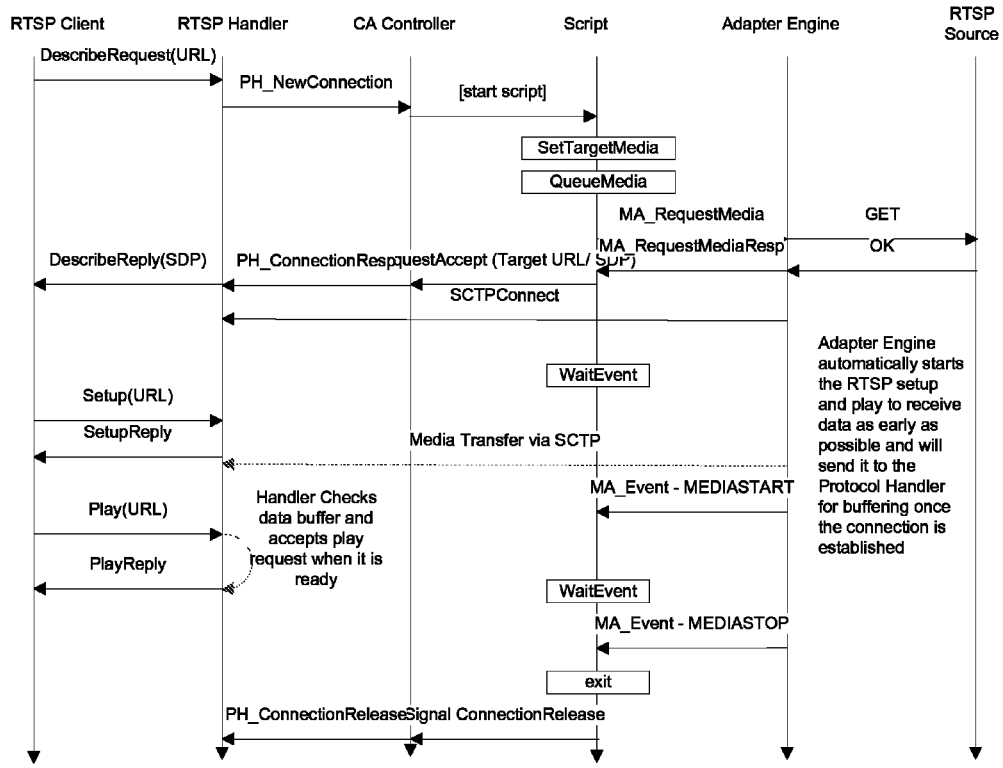
FIG. 20 is a sequence diagram illustrating HTTP client connecting to an RTSP source according to an embodiment of the present invention.

FIG. 20 shows an HTTP client connecting to an RTSP source. In some embodiments the RTSP PH buffers the received stream data until a PLAY request is received; and waits until it has a sufficiently full buffer to ensure it can playback in real time (taking into account the content length and the delivery rate of incoming data).

The present invention also combines the aforementioned modules with system maintenance modules and system expansion modules that allow for the apparatus to act as a redundant back-up for another, similar system, or as an expansion unit for another system.

To perform the functions mentioned throughout this specification, embodiments of the system include one or more processing units (such as digital signal processors (DSPs), FPGA/ASICs or general purpose processors), one or more memories, an operating system or systems (to allow access to the different hardware resources), a bus with a bus control unit, and a resources control unit.

The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein. For example, the functionality above may be combined or further separated, depending upon the embodiment. Certain features may also be added or removed. Additionally, the particular order of the features recited is not specifically required in certain embodiments, although may be important in others. The sequence of processes can be carried out in computer code and/or hardware depending upon the embodiment. Of course, one of ordinary skill in the art would recognize many other variations, modifications, and alternatives.

Additionally, it is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus for adapting media content in one or more networks, the apparatus comprising:
   a controller module;
   one or more network interface modules;
   one or more protocol interface modules coupled to the controller module;
   a script interpretation module coupled to the controller module and programmed to:
   interpret instructions provided in a scripting language;
   determine based on information received in a client request for media content, at least one data encoding attribute required in output media data corresponding to the client request; and
   determine based on
      (i) source media data available at the apparatus, and
      (ii) the determined at least one data encoding attribute,
   at least one required alteration to coding of the available source media data corresponding to the client request, wherein the at least one required alteration to coding enables re-encoding the available source media data to output media data corresponding to the client request and having the at least one data encoding attribute;
   one or more media adaptation modules coupled to the controller module for re-encoding the available source media data corresponding to the client request by applying the at least one required alteration to coding of said available source media data for obtaining output media data corresponding to the client request and having the determined at least one data encoding attribute; and
   a management interface module coupled to the controller module.

2. The apparatus of claim 1 wherein a media adaptation module of the one or more media adaptation modules is configured to transcode, transrate, transize, or filter media data.

3. The apparatus of claim 1 wherein a protocol interface module of the one or more protocol interface modules is adapted to handle a session of one or more of Hypertext Transfer Protocol (HTTP), Session Initiation Protocol (SIP), or Real Time Streaming Protocol (RTSP).

4. The apparatus of claim 1 wherein the available source media data is received at the apparatus as streaming media and is provided from the apparatus as a download or a progressive download or media is received at the apparatus as a download or progressive download and is provided from the apparatus as streaming media data.

5. The apparatus of claim 1 wherein the one or more protocol interface modules are adapted to receive a first request from the client using a first protocol and a second protocol interface module of the one or more protocol interface modules is adapted to transmit a second request to the content server using a second protocol.

6. The apparatus of claim 5 wherein the first protocol is selected from the group consisting of HTTP, RTSP and SIP and the second protocol is selected from the group consisting of HTTP, RTSP and SIP.

7. The apparatus of claim 5 wherein the first protocol comprises HTTP and the second protocol comprises RTSP or the first protocol comprises RTSP and the second protocol comprises HTTP.

8. The apparatus of claim 1 wherein the script interpretation module is programmed to request data from a database to inform its decisions.

9. The apparatus of claim 1 wherein the script interpretation module is programmed to provide to the client output media data obtained from a first set of source media data from a first source and a second set of source media data from a second source wherein one or more attributes of size, rate and codec are different between the output media data, the first set of source media data and the second set of source media data.

10. The apparatus of claim 1 wherein the one or more media adaptation modules support one or more of audio, video, or meta data.

11. The apparatus of claim 1 further comprising a caching module coupled to the one or more media adaptation modules.

12. The apparatus of claim 1 further comprising a load balancing module coupled to the one or more media adaptation modules.

13. The apparatus of claim 12 wherein the load balancing module is configured to estimate a load prior to determination of one or more session characteristics and update the load after determining the one or more session characteristics.

14. The apparatus of claim 1 wherein the available source media data is stored on a server.

* * * * *